US008005660B2

(12) United States Patent
Chiu et al.

(10) Patent No.: US 8,005,660 B2
(45) Date of Patent: *Aug. 23, 2011

(54) HIERARCHICAL STOCHASTIC ANALYSIS PROCESS OPTIMIZATION FOR INTEGRATED CIRCUIT DESIGN AND MANUFACTURE

(75) Inventors: Hsien-Yen Chiu, San Jose, CA (US); Meiling Wang, Tucson, AZ (US); Jun Li, San Jose, CA (US)

(73) Assignee: Anova Solutions, Inc., Santa Clara, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 11/823,601

(22) Filed: Jun. 27, 2007

(65) Prior Publication Data

US 2008/0059143 A1    Mar. 6, 2008

Related U.S. Application Data

(63) Continuation-in-part of application No. 11/301,999, filed on Dec. 12, 2005, now Pat. No. 7,243,320.

(51) Int. Cl.
*G06F 17/50* (2006.01)
(52) U.S. Cl. ........................................ 703/14
(58) Field of Classification Search .................. 703/14
See application file for complete search history.

(56) References Cited

U.S. PATENT DOCUMENTS

2002/0073394 A1    6/2002    Milor et al.
2005/0235232 A1    10/2005   Papanikolaou et al.

OTHER PUBLICATIONS

Z. Feng et al., "Reducing the Complexity of VLSI Performance Variation Modeling Via Parameter Dimension Reduction", Mar. 26, 2007, Proceedings of the 8th International Symposium on Quality Electronic Design, six unnumbered pages.*
Eric Felt et al., "Hierarchical Statistical Characterization of Mixed-Signal Circuits Using Behavioral Modeling", 1996, Proceedings of the International Conference on Computer Aided Design ICCAD, seven pages.*
Zhuo Feng et al., "Fast second-order statistical static timing analysis using parameter dimension reduction", Jun. 4, 2007, Design Automation Conference 2007, pp. 244-249.*

(Continued)

*Primary Examiner* — Paul L Rodriguez
*Assistant Examiner* — Russ Guill
(74) *Attorney, Agent, or Firm* — Dergosits & Noah LLP; Geoffery T. Staniford

(57) ABSTRACT

An Integrated Circuit Design tool incorporating a Stochastic Analysis Process ("SAP") is described. The SAP can be applied on many levels of circuit components including transistor devices, logic gate devices, and System-on-Chip or chip designs. The SAP replaces the large number of traditional Monte Carlo simulations with operations using a small number of sampling points or corners. The SAP is a hierarchical approach using a model fitting process to generate a model that can be used with any number of performance metrics to generate performance variation predictions along with corresponding statistical information (e.g., mean, three-sigma probability, etc.). A hierarchical SAP process breaks an overall circuit into a plurality of subcircuits and performs circuit simulation and SAP analysis steps on each subcircuit. An integration and reduction process combines the analysis results of each subcircuit, and a final SPICE/SAP process provides a model for the overall circuit based on the subcircuits.

12 Claims, 19 Drawing Sheets

OTHER PUBLICATIONS

Michael Orshansky et al., "A statistical performance simulation methodology for VLSI circuits", 1998, Design Automation Conference 1998, pp. 402-407.*

T. Fujita et al., "A method for linking process-level variability to system performance", 2000, Proceedings of the Asia and South Pacific Design Automation Conference 2000, pp. 547-551.*

Fang Liu et al., "Hierarchical Analysis of Process Variation for Mixed-Signal Systems", Jan. 18, 2005, Design Automation Conference 2005, pp. 465-470.*

Fang Liu et al., "Hierarchical Variance Analysis for Analog Circuits Based on Graph Modelling and Correlation Loop Tracing", Mar. 7, 2005, Design Automation and Test in Europe 2005, six unnumbered pages.*

Stefano Zanella et al., "Modeling of Substrate Noise Injected by Digital Libraries", 2001, International Symposium on Quality Electronic Design, pp. 488-492.*

Hatono et al., "Modeling and Online Scheduling of Flexible Manufacturing Systems Using Stochastic Petri Nets," Feb. 1991, IEEE Transactions on Software Engineering, vol. 17, iss. 2, pp. 126-132.

Sethi et al., "Hierarchical Production and Setup Scheduling in Stochastic Manufacturing Systems," Dec. 1994, Proceedings of the $33^{rd}$ IEEE Conference on Decision and Control, vol. 2, pp. 1571-1576.

Shi et al., "Design and Optimization of Complex Real-Time Dependable Systems," Feb. 1996, Proceedings of WORDS' 96., Second Workshop on Object-Oriented Real-Time Dependable Systems, pp. 218-224.

Soner et al., "An Asymptotic Analysis of Hierarchical Control of Manufacturing Systems," Dec. 1988, Proceedings of the $27^{th}$ IEEE Conference on Decision and Control, vol. 3, pp. 1856-1857.

* cited by examiner

HIERARCHICAL STOCHASTIC ANALYSIS PROCESS OPTIMIZATION FOR INTEGRATED CIRCUIT DESIGN AND MANUFACTURE

CROSS-REFERENCE TO RELATED APPLICATIONS

The current application is a Continuation-in-Part of U.S. patent application Ser. No. 11/301,999, entitled "Stochastic Analysis Process Optimization for Integrated Circuit Design and Manufacture" filed Dec. 12, 2005, and issued as U.S. Pat. No. 7,243,320 on Jul. 10, 2007, and which is hereby incorporated by reference in its entirety.

FIELD

The embodiments provided herein relate generally to designing and fabricating integrated circuits, and more specifically to modeling methods for circuit simulation.

BACKGROUND

The continual advancement in manufacturing technologies and the resultant process variations have caused performance variability (delay/timing, power) to become increasingly significant. Statistical models have become mandatory to model the performance variability. Due to the high complexity of the current VLSI and ULSI designs, existing models, algorithm or tools are not able to guarantee the accuracy and efficiency of the performance prediction at the same time.

The design and production of current generation integrated circuits that can include up to several million transistors is a very complex operation. Many sources of variation, such as device dimensions and environmental factors (power, temperature), can significantly impact the yield during the manufacturing stage. Accurately predicting what change may occur during the manufacture of a device due to one or more possible variations is of great value in optimizing a design to account for such variations. Current methods of predicting changes that may occur due to variations of design and/or manufacture typically involve the use of statistical distribution of design uncertainty and sampling models, such as Monte Carlo analysis, Latin Hypercube, and similar techniques. These methods, however, are generally disadvantageous in that they require significant processing overhead, time, and are not scalable.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
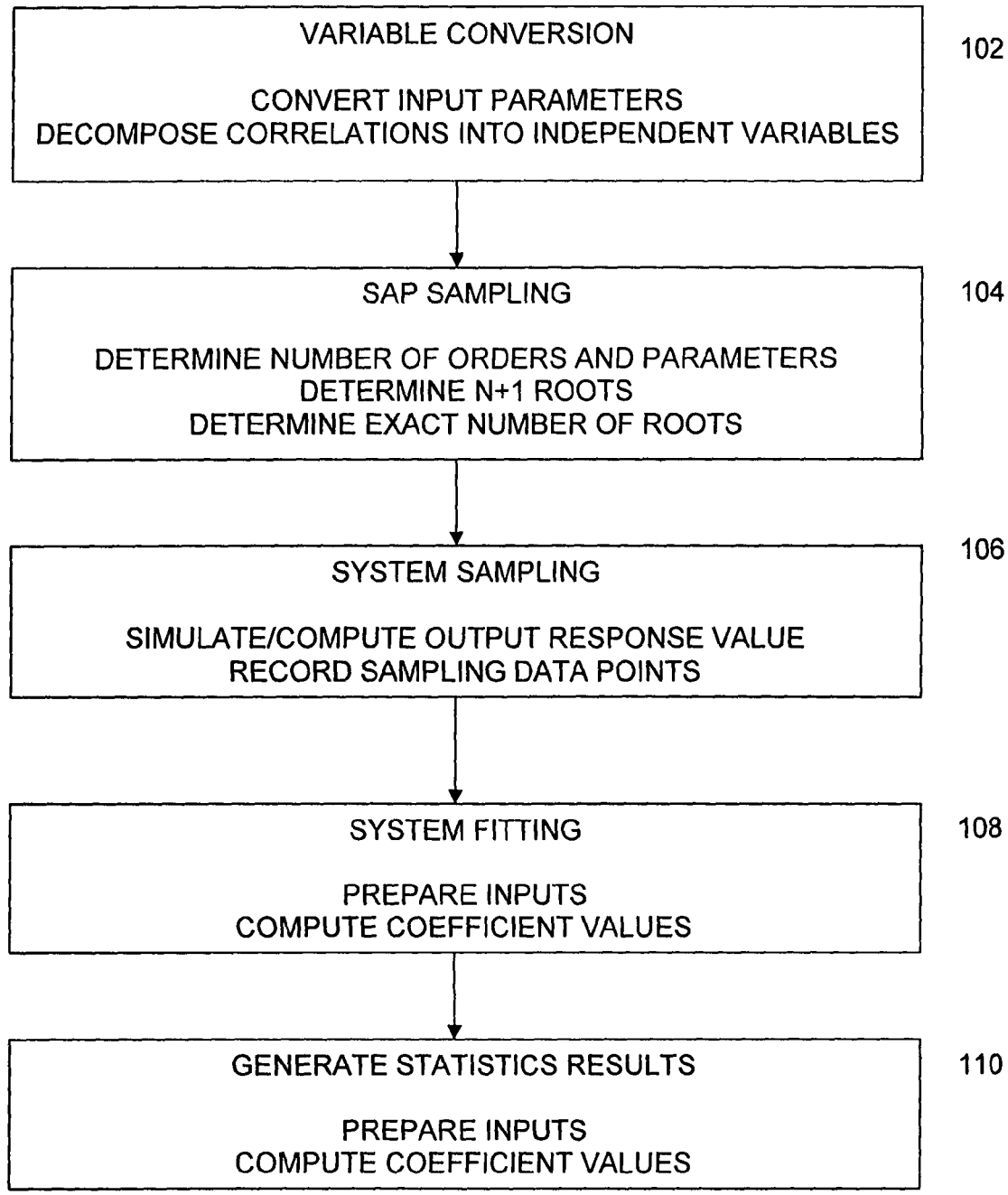
FIG. 1 is a flowchart that illustrates the general steps in deriving an SAP model, under an embodiment.

A Stochastic Analysis Process ("SAP") is described below. The SAP can be applied on many levels of very-large-scale integrated ("VLSI") circuit components including transistor devices, logic gate devices (standard cells), ASIC blocks and System-on-Chip ("SoC") or chip designs. The SAP generally replaces the large number of Monte Carlo simulations currently performed on a large number of performance metrics of a design. The SAP replaces this large number of simulations with operations using a small number of sampling points or corners. The SAP is a hierarchical approach using a model fitting process to generate a model that can be used with any number of performance metrics to generate performance variation predictions along with corresponding statistical information (e.g., mean, three-sigma probability, etc.). The SAP thereby provides an efficient way of modeling the circuit or system variation due to global parameters such as device dimensions, interconnect wiring variations, environmental variations, and manufacturing variations. A hierarchical SAP process breaks an overall circuit into a plurality of subcircuits and performs circuit simulation and SAP analysis steps on each subcircuit. An integration and reduction process combines the analysis results of each subcircuit, and a final circuit simulation/SAP process provides a model for the overall circuit based on the subcircuits.

Using the SAP, an effective variation analysis can be applied on SoC designs. Both designer and manufacturing can benefit from the chip variation predictions, which will help in the production of robust chip designs with fast high yield ramps. The results from the SAP may also subsequently be used as the chip performance yield optimization.

SAP Background

In general, a stochastic process is a random process in which there is some indeterminancy in its future evolution described by probability distributions. SAP is a type of response surface method (RSM) modeling. RSM models the relation between an input parameter and output response and is usually used in a statistical environment. Most adapted forms for RSM are second-order polynomials of the input parameter. The simplest representation of output in RSM is:

$$f(x_1 \sim x_n) = f_0 + \sum_j c_j x_j + \sum_{i,j} c_{i,j} x_i x_j$$

For the above equation, if the xj is normal distribution with std=1, then the choice of testing(measuring) points would be among (0, +1, −1). In other words, the testing point is normally fallen on the mean and one standard deviation of each input parameter.

One issue for implementing RSM is selecting the actual input points to generate a good model from a sense of probability. The stochastic analysis procedure (SAP) is a special kind of RSM that provides "collocation" measurement points for better approximated RSM in a probability sense.

The concept of collocation points is derived from the Gaussian Quadrature Integral, which is a numerical integral method with better accuracy compared to other methods, such as the Newton-Cotes Integral. In this integral method, if the function f(x) is less than order 2n:

$$f(x) = Q(x) * H_n(x) + R(x)$$

in which Q(x), R(x) are less than order n. Ln(x) is an order-n Hermite polynomial:

$$\int_{-\infty}^{\infty} f(x) \exp(-x^2) dx = \int_{-\infty}^{\infty} Q(x) * H_n(x) \exp(-x^2) dx + \int_{-\infty}^{\infty} R(x) \exp(-x^2) dx$$

$$= 0 + \sum_{j=1}^{n} c_j R(x_j) = \sum_{j=1}^{n} c_j f(x_j)$$

where $x_j$ is the root of order-n Hermite polynomial.

This idea can be applied to zone [−1,1] or [0,inf] with Legendre and Laguerre polynomials:

$$\int_{-1}^{1} f(x) dx = \sum_{j=1}^{n} c_j f(x_j) \quad x_j \text{ is root of } P_x(x)$$

$$\int_{0}^{\infty} f(x) \exp(-x) dx = \sum_{j=1}^{n} c_j f(x_j) \quad x_j \text{ is root of } L_x(x)$$

SAP extends this integral to response surface RSM. If the output can be approximated as orthogonal polynomials gj(x), then:

$$f(x) = f_0 + \sum_j c_j g_j(x) + R(x)$$

If the order of approximation is less than order n, and the residues R is less than n, then the approximation error can be defined as:

$$error_{AV} = \int_{domain} \left(f(x) - \sum c_j g_j(x)\right) * w(x) dx = \sum_i \left(f(x_i) - \sum c_j g_j(x_i)\right)^2 * w(x_i)$$

$$error_{LS} = \int_{domain} \left(f(x) - \sum c_j g_j(x)\right)^2 * w(x) dx = \sum_i \left(f(x_i) - \sum c_j g_j(x_i)\right)^2 * w(x_i)$$

SAP Input Variable Conversion

Before performing an SAP fitting operation, the input parameters must first be made into "independent standard normal" distributions. This involves first transforming the distribution into a standard normal distribution and then decomposing the correlation between the variables into independent ones.

For sampling, these standard normal variables must be reverse-transformed back to original input parameters. If the distribution is a normal distribution, then all that needs to be done is to re-scale and re-shift back to the standard normal. This can also be done for a distribution closed to Gaussian. For any other given distribution, it is normally easier to transfer the parameter to standard uniform [0.1] distributed then normal distributed. Conversion from standard uniform and standard normal could be done by using the following equations:

| $\eta \to \xi$ | $\xi \to \eta$ |
|---|---|
| $\xi = \Phi^{-1}(\eta)$ | $\eta = \Phi(\xi)$ |

$$\Phi(\xi) = \int_{\tau=-\infty}^{\xi} \frac{1}{\sqrt{2\pi}} \exp(-\tau^2/2) d\tau$$

$$= \begin{cases} (1 + \text{erf}(\xi/\sqrt{2}))/2 & \xi > 0 \\ (1 - \text{erf}(-\xi/\sqrt{2}))/2 & \xi < 0 \end{cases}$$

$$\Phi^{-1}(\eta) = \begin{cases} 2 * err^{-1}(\eta) + 1 & \eta > 0.5 \\ 2 * err^{-1}(\eta) - 1 & \eta < 0.5 \end{cases}$$

The transform $x \to \zeta$, $\zeta \to \xi$ could be used to get $x \to \xi$, and reversely, from $\xi \to \zeta$, $\zeta \to x$, to get $\xi \to x$.

For general distributions, the CDF (Cumulated Distribution Function) is needed, which can be obtained from formula or tables. The idea behind the transform is that cdf(x) is exactly the transform from x to standard uniform [0,1]. So, the following part needed is transforming it from standard uniform to standard normal.

| $X \to \eta$ | $\eta \to \xi$ | $x \to \xi$ |
|---|---|---|
| $\eta = \text{cdf}(x)$ | $\xi = \Phi^{-1}(\eta)$ | $\xi = \Phi^{-1}(\text{cdf}(x))$ |
| $\xi \to \eta$ | $\eta \to x$ | $\xi \to x$ |
| $\eta = \Phi(\xi)$ | $x = \text{cdf}^{-1}(\eta)$ | $x = \text{cdf}^{-1}(\Phi(\xi))$ |

If the input parameters have mutual correlation, Principal Component Analysis (PCA) can be used to decompose these correlations. The PCA is performed with Eigen value decomposition to get the Eigen values (principal values) and mutual linear independent vectors. By using these, the correlation of transformed variables is 0.

$$\Gamma = \begin{bmatrix} 1 & & \gamma_{n1} \\ & \gamma_{i,j} & \\ \gamma_{1n} & & 1 \end{bmatrix} \quad \gamma_{i,j} = \frac{\langle (x_i - \mu_i)(x_j - \mu_j) \rangle}{\sigma_i \cdot \sigma_j}$$

$$\Gamma = U \begin{bmatrix} \lambda_1^2 & & 0 \\ & O & \\ 0 & & \lambda_M^2 \end{bmatrix} U^T$$

Then, the transformation formula can be written as:

$$\begin{bmatrix} x_1 \\ \vdots \\ x_N \end{bmatrix} = \begin{bmatrix} \sigma_1 & & 0 \\ & O & \\ 0 & & \sigma_M \end{bmatrix} U^T \begin{bmatrix} \lambda_1 & & 0 \\ & O & \\ 0 & & \lambda_M \end{bmatrix} \begin{bmatrix} \eta_1 \\ \vdots \\ \eta_M \end{bmatrix} + \begin{bmatrix} \mu_1 \\ \vdots \\ \mu_N \end{bmatrix}$$

SAP Fitting

The target of the approximation is to minimize the error from finding coefficient c(s). For average error case, the following equations are used:

$$error_{AV} = \sum_i \left( f(x_i) - \sum_k c_k g_k(x_i) \right) w(x_i)$$

$$f(\xi_i) = \sum_{j=0}^{n} c_j g_j(\xi_i) \text{ on root } g_{n+1}(\xi_i) = 0$$

$$\Rightarrow [g_K(\xi_i)][c_K] = [f(\xi_i)]$$

For least square error case, a partial derivation is used to get the minimum, and then a Gauss-Quadrature Integral is applied:

$$\frac{\partial error_{LS}}{\partial c_K} = \sum_i \left( f(x_i) - \sum_M c_M g_M(x_i) \right) g_k(x_i) * w(x_i) = 0$$

$$\Rightarrow \sum_M \left\{ \sum_i g_K(x_i) * w(x_i) * g_M(x_i) \right\} * c_M = \left\{ \sum_i f(x_i) * w(x_i) g_k(x_i) \right\}$$

$$\Rightarrow [A_{K,M}][c_M] = [F_K] \quad k, M = 1 \sim \text{order}$$

$$\Rightarrow [c_M] = [A_{K,M}]^{-1}[F_K]$$

In this way, the value of the coefficients can be calculated to get the approximation functions, and the mean and variance of the SAP by:

$$f(x) \approx \sum_j c_j g_j(x)$$

$$\langle f(x) \rangle = c_0$$

$$\langle f(x)^2 \rangle - \langle f(x) \rangle^2 = \sum_{j=1} c_j^2$$

The above discussion describes one-dimensional SAP. To construct a multidimensional SAP, a multi-dimensional weighted orthonormal polynomial must first be constructed. To construct the polynomials, one-dimensional polynomials are first developed:

$H_0(x), H_1(x), H_2(x), H_3(x)$
$H_0(y), H_1(y), H_2(y), H_3(y)$
$H_0(z), H_1(z), H_2(z), H_3(z)$

Order 0 polynomials are constructed containing all the following: 1.
Order 1 polynomials are then constructed containing all the following:
  $H_1(x), H_1(y), H_1(z)$.
Next, order 2 polynomials are constructed containing all the following:
  $H_2(x), H_2(y), H_2(z), H_1(x)H_1(y), H_1(x)H_1(z), H_1(z)H_1(y)$
Then, order 3 polynomials are constructed containing all of the following:
  $H_3(x), H_3(y), H_3(z), H_1(x)*H_2(y), H_1(x)*H_2(z), H_1(y)*H_2(z), H_1(y)*H_2(x), H_1(z)*H_2(x), H_1(z)*H2(y)$, In general, these polynomials are orthonormal. Weighted functions, like H(x), P(y), may also be mixed, which allows the generation of multi-dimensional polynomials by: Order 0 polynomials containing all the following: 1; order 1 polynomials containing all the following: $H_1(x), P_1(y)$; order 2 polynomials containing all the following: $H_2(x), P_2(y), H_1(x)*P_1(y)$.

Similarly, multivariable SAP models could be constructed as linear combinations of orthogonal functions. The p input parameters for an order-n approximation of SAP is:

$$f(x_1 \sim x_p) = f_0 + \sum c_{j1 \sim jk} g_{j1 \sim jk}(x_1 \sim x_p) + R(x_1 \sim x_p) \max \sum_k j_k = n$$

In the same way, a minimum error could be constructed by:
Minimized Average Error:

$$[g_{j1-jk}(\xi_1 \sim \xi_p)][c_{j1-jk}] = [f(\xi_1 \sim \xi_p)]$$

Minimized Least Squared Error:

$$\sum_M \left\{ \sum_i g_K(\xi_i) * g_M(\xi_i) \right\} * c_M = \left\{ \sum_i f(\xi_i) * g_K(\xi_i) \right\}$$

Weighted Minimized Least Squared Error:

$$\sum_M \left\{ \sum_i g_K(\xi_i) * w(\xi_i) * g_M(\xi_i) \right\} * c_M = \left\{ \sum_i f(\xi_i) * w(\xi_i) * g_K(\xi_i) \right\}$$

The above error-formulas are very closed, but can be derived as follows:

$$\begin{cases} G_{M,K} = [g_K(\xi_M)] \\ W_{i,i} = [w(\xi_i)]\delta_{i,j} \\ C_j = [c_j] \\ F_j = [f(\xi_j)] \end{cases}$$

The Average Error then becomes:

$$GC = F$$

$$\leftrightarrow [g_K(\xi_M)][c_K] = [f(\xi_M)]$$

The Least Square Error means (multiplied by G transposed):

$$(G^T G)C = G^T F$$

$$\leftrightarrow [g_J(\xi_M)][g_K(\xi_M)][c_K] = [g_J(\xi_M)][f(\xi_M)]$$

The Weighted Least Square Error means (multiplied by weights and then G transposed):

$$(G^T W G) C = G^T W F$$

$$\leftrightarrow [g_J(\xi_M)][w(\xi_M)][g_K(\xi_M)][c_K] = [g_J(\xi_M)][w(\xi_M)][f(\xi_M)]$$

For the above equations, it can be seen that if G is invertible (non singular), then all three above equations are identical; and if G is not invertible (G is m×n m>n), then the least squared (with/without weighted) version must be used.

In other words, if the average error solution is adopted, then the exact same coefficients for all three equations are generated. However, if there are cases where experimental data is used, then the average error formula is difficult to be apply, in which case the least square method or the weighted least square error method can be used.

Another issue is that for the Average Error equation, the G matrix is asymmetric, which might cause a numerical error when inverses is computed. The Least Square Error equations are more symmetric, so a method, such as the Chelosky Decomposition technique can be used to obtain a more accurate result.

Generation of SAP Inputs of Samples

For best fitting the orthogonal polynomials, the sampling points should be carefully selected. Since the SAP method is related to Gaussian Quadrature, the best sampling points can generally be obtained from the roots of the equations chosen for order (n+1), one dimensional orthogonal function, $$H_{n+1}(\xi_i) = 0 \quad i = 1 \sim n+1$$

For minimized average error, an issue resulting in the multi-dimensional case is that the number of known equations is larger than unknown coefficients. For an SAP application of order-n, with p parameters, there are $(n+1)^p$ function evaluations, but only the following number of coefficients to be solved:

$$C_n^{n+p} = (n+p)!/(n!p!)$$

For example, for a second-order SAP model with three parameters, there will be 10 coefficients and 27 equations. In the meantime, if p=1, then (n+1) coefficients are needed and (n+1) equations exist. Thus, the mismatch for equations and unknowns, while p>1 generates the same questions for SAP as for traditional RSM. Solving this issue involves: (1) using all combinations, and fitting the parameters with least square fitting; (2) choosing an exact number of points, by random order, or by order of highest probability first; and (3) choosing an exact number of points along with extra points to get better fit of the parameters.

For the least square method, the same ideas from minimum average error method can be applied. Alternatively, a "largest weight first" schema can be used to select high priority points to form the roots. Another observation from the formula of the least squared method is that the number of known function values can be less than the number of unknowns. In another words, fewer points can be selected for the coefficients. This is used to develop an "adaptive" version of SAP.

For further reducing the number of function evaluations needed, a Pade method can be employed to do "renormalization" on the SAP formulas:

$$f(x_1 \sim x_p) = f_0 + \sum c_{j1 \sim jk} g_{j1 \sim jk}(x_1 \sim x_p) + R(x_1 \sim x_p) \max \sum_k j_k = 2n$$

$$\Rightarrow f(x_1 \sim x_p) = \frac{f_0 + \sum c_{j1 \sim jk} g_{j1 \sim jk}(x_1 \sim x_p)}{1 + \sum b_{j1 \sim jk} g_{j1 \sim jk}(x_1 \sim x_p)} + R(x_1 \sim x_p) \max \sum_k j_k = nn$$

The advantage of this method is that it needs less simulation points and can match highly nonlinear functions better than a polynomial. However, in this method bounded domain random distributions are preferred, accuracy is generally hard to control and the cross-terms for multi-dimensions might be lost.

SAP Statistics

If SAP models are generated after an SAP fitting procedure, the output distribution can be generated from the following equation:

$$f(x_1 \sim x_p) = f_0 + \sum c_{j1 \sim jk} g_{j1 \sim jk}(x_1 \sim x_p) + R(x_1 \sim x_p) \max \sum_k j_k = n$$

There are basic three approaches: the Four Moment method, the Monte Carlo method, and using Pre-generated results. The steps of the Four Moment methods are as follows:
1. The mean of output distribution is $\mu = f_0$
2. The variance of the output distribution is $$\sigma^2 = \Sigma c_{j1-jk}^2$$

3. The skew of output distribution is $$\sum_{odd-order} c_{j1-jk}^3 / \sigma^3$$

4. The Kurtosis of the output distribution is $$\Sigma c_{j1-jk}^4 / \sigma^4 - 3$$

For the Monte Carlo method, the general distribution could be generated by standard Monte Carlo techniques over SAP formulas.

For the case in which pre-generated results are used, the process involves:
1. Pre-generating the CDF from Hermite functions, $H_1(x)$, $H_2(x)$, $H_1(x)*H_1(y)$, by Monte Carlo simulation; and then using the following method to generate the final distribution: (1) multiplied by a constant, scale the x-axis for CDF; (2) add/subtract a constant, and shift the x-axis for CDF.

The general steps in deriving an SAP model in one embodiment, is illustrated in the flowchart of FIG. 1. The process begins with variable conversion 102. In the process of variable conversion, the input parameters are first converted to independent normal distributions (Gaussian with standard deviation equal to 1). The correlations are then decomposed into independent variables. The process also records how to transform these normal variables back to the original parameters.

In 104, SAP sampling is performed. In this process, it is first determined the number of the orders (n) and parameters (p) needed. Then the n+1 roots from $H_{n+1}(\xi) = 0$ are determined. Next the exact number, $C_n^{n+p} = (n+p)!/(n!p!)$ of roots from $(n+1)^p$ roots are selected. In one embodiment, this is done by selecting the order of high-probability first in terms of priority. The roots are then transformed back to original input parameters for sampling inputs.

In 106, system sampling is performed. In one embodiment, the system comprises a known or predefined system in which input signals or values are transformed into output signals or values. A system can be a circuit (e.g., transistor, gate, or logic block level circuit), black box, simulation program, network, or any transformative object or set of rules. Using the input parameters, the process simulates or computes the output response value. The inputs and outputs are then recorded as sampling data points.

In 108, an SAP fitting process is executed. In this process, the inputs are prepared and then the coefficient values are determined using the minimum Average Error formulas, such as described above. Alternatively, the Least Squared Error formula can be used to compute the coefficients. The fitting result is then written to the SAP model or models.

In 110, the statistics results are generated. This process can be done by using the following equation to derive the SAP models and generate output distributions:

$$f(x_1 \sim x_p) = f_0 + \sum c_{j1-jk} g_{j1-jk}(x_1 \sim x_p) + R(x_1 \sim x_p) \max \sum_k j_k = n$$

SAP-Based Circuit Design

In one embodiment, the SAP method is used in processes involving the design, simulation, implementation and manufacture of electronic and semiconductor devices, such as integrated circuits (ICs). With regard to circuit design and validation using SAP, reducing the number of variables is important for several reasons. For example, under current ULSI (Ultra Large-Scale Integration) technology, the number of transistors on a single device ("chip") can number on the order of several million. If only one random factor exists per transistor (e.g., dopant concentration), then there are millions of variables to handle during any of the manufacturing processes, which can be extremely processor-intensive, if not virtually impossible to resolve. Thus, a hierarchical reduction of variables is advantageous. Even at the cell level, one CMOS cell has several transistors. If each transistor has three variables: Leff, Weff, Vth, then there are dozens of variables to handle. For simulating single cells, hundreds of simulations must be performed. Thus, cell level reduction is generally needed to model most circuits.

For computation purposes, SAP formulas must be propagated. If, in the propagation path, there is a one random variable per cell to be merged in propagation process, the number of variables will increase. Thus, there must be a way to keep the number of variables propagated at a constant value. In application, the users might need the information of principal axis (principal component). In this case, reduction technology could provide the result. Therefore, reduction is needed for (1) Cell level reduction of variables; (2) Hierarchical reduction of variables for block reduction; (3) SAP formula propagation in delay calculation; and (4) Identification of the principal component of the SAP.

The basic idea of reduction is to find a particular direction from the parameters space. Along this direction, variation is maximized compared to other directions. Because the distribution is normal (multi-dimensional), then to any direction, the distribution is also normal (one-dimensional).

The variation can be described as follows:

$$\vec{x} = \vec{\alpha}t \, |\vec{\alpha}| = 1 \max \int_{-\infty}^{\infty} (f(x_1 \sim x_n) - \bar{f})^2 \exp(-t^2) dt$$

$$= \int_{-\infty}^{\infty} (f(\vec{\alpha}, t) - \bar{f})^2 \exp(-t^2) dt$$

$$= \int_{-\infty}^{\infty} \left( \sum_k H_k(\vec{\alpha}, t) \right)^2 \exp(-t^2) dt$$

$$= \text{Var}(\vec{\alpha})$$

Because the new variable is linear combination of original variables it follows that:

$$q = \vec{\alpha} \cdot \vec{x} \, |\vec{\alpha}| = 1$$

Another way to derive optimization formula would be based on equivalent point of view:

$$\min error(\vec{\alpha}) = \int_{-\infty}^{\infty} \left( \sum_k c_k H_k(\vec{x}) \right)^2 - \left( \sum_k c_k H_k(\vec{\alpha} \cdot \vec{x}) \right)^2 \exp(-\vec{x}^2) dt$$

For this method, the following steps are performed:

1. Compute original output function variation as sum of coefficient square. substitute the $q = \vec{\alpha} \cdot \vec{x} \, |\vec{\alpha}| = 1$ back to the SAP formula, then the new SAP formula would compute new output variation as the sum of the new coefficient square.

2. Minimize the difference between original variation and new output variations.

Another view point of reduction is to reduce the approximation error (caused by choosing only one new variable). For this, the following formula is used:

$$\min Error(\vec{\alpha}) = \int_{-\infty}^{\infty} \left( \sum_k c_k H_k(\vec{x}) - \sum_k c_k H_k(\vec{\alpha} \cdot \vec{x}) \right)^2 \exp(-\vec{x}^2) dt$$

In finding the principal component, one method to find the extreme vector, is to use Lagragian relaxation.

$$\min \left\{ Error(\vec{\alpha}) + \lambda^2 \left( \sum_i \alpha_i^2 - 1 \right)^2 \right\}$$

$$\Rightarrow \begin{cases} \dfrac{\partial}{\partial \alpha_k} \left\{ Error(\vec{\alpha}) + \lambda^2 \left( \sum_i \alpha_i^2 - 1 \right)^2 \right\} = 0 \\ \dfrac{\partial}{\partial \lambda} \left\{ Error(\vec{\alpha}) + \lambda^2 \left( \sum_i \alpha_i^2 - 1 \right)^2 \right\} = 0 \end{cases}$$

However, these equations are generally nonlinear, so it may be difficult to get correct solutions. In this case, a special case can be used to find exact solutions, and a heuristic solution can be used for general cases.

In the special case of linear approaches, if only order one Hermite polynomial is used to approximate the function, then the function is as follows:

$$f(x_1 \sim x_n) = f_0 + \sum_{i=1}^{n} c_i x_i$$

This formula can be used to derive:

$$\alpha_i = \frac{c_i}{\sqrt{\sum_i c_i^2}}$$

So, a single vector can be used to represent the variation:

$$f(q) = f_0 + \sqrt{\sum_{i=1}^{n} c_i^2 q}$$

$$q = \sum_{i=1}^{n} \alpha_i x_i$$

For the general solution, one way to compute the nonlinear multivariable function is to use the "steepest descent" or Newton methods. In general, this is an iterative method involving cases in which the function is convergent to a non-target point, or not even convergent at all. In this case, some heuristics can be used to make them convergent. Under this approach, if enough information for variation can be obtained, then the important direction can be derived. A linear approach is used as an initial guess to start a steepest descent optimization process. Alternatively the variation caused by each variable can be used as a measure to weight the linear combinations. With a closer initial guess, more convergent results can be obtained.

Once the dominant vector is extracted from the SAP, more vectors can be extracted from residue of the remainders. Basically, the "orthogonal" between these vectors must be considered, because the SAP requires that the variables be independent variables. A process such as the Gram-Schmit orthogonalization process can be used to ensure the orthogonalality between a current new extracted variable with a former orthogonal set.

Figure 2:
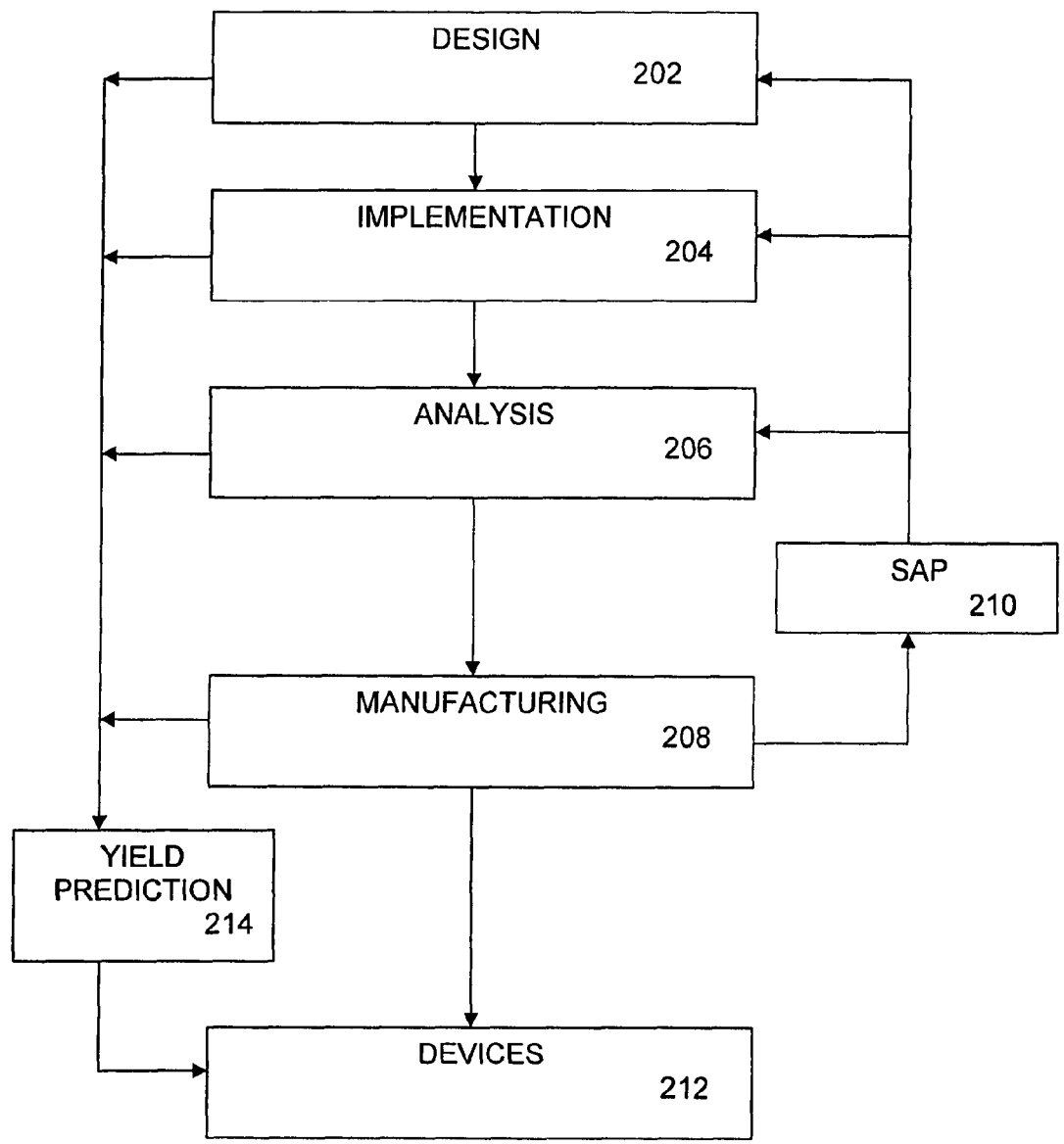
FIG. 2 is a first block diagram of an Integrated Circuit design and manufacturing process including a Stochastic Analysis Process (SAP), under an embodiment.

In one embodiment, an SAP modeling method is used in the design stage of integrated circuit manufacturing cycle to model the effects of different possible variations related to the design, manufacture, implementation, operating conditions, or environment related to the finished IC product. FIG. 2 is a first block diagram of an Integrated Circuit design and manufacturing process including an SAP, under an embodiment. In FIG. 1, the overall process begins with the design 202 of the integrated circuit. It can be assumed for purposes of illustration that the IC device is a VLSI (Very Large-Scale Integration) device that contains hundreds of thousands of discrete transistors, however, the process described herein can be scaled upwards for devices with millions of transistors, or cells with only a few transistors or gates.

After a design is set, it is implemented 204 and analyzed 206. IC products are then manufactured 208 according to the design to produce wafers that are then packaged as individual IC devices or "chips" 212. A yield prediction process 214 may be implemented between the manufacturing 208 and final chip assembly stage 212 to predict that actual number of usable chips that will be produced. For the embodiment shown in FIG. 2, an SAP method 210 is implemented between the manufacturing and analysis, implementation, and design stages to predict the effects of different variations associated with these stages on the final product yield. This modeling method allows steps to be taken at the design stage 202 to improve or optimize the design and/or implementation/manufacturing process to account for variations in the overall process. The SAP method 210 replaces standard Monte Carlo modeling methods by selecting a small number of sampling points (compared to traditional methods) and performing the simulation operations on the selected sampling points. A single corner point is selected and a model fitting process is performed on the sample points.

Figure 3:
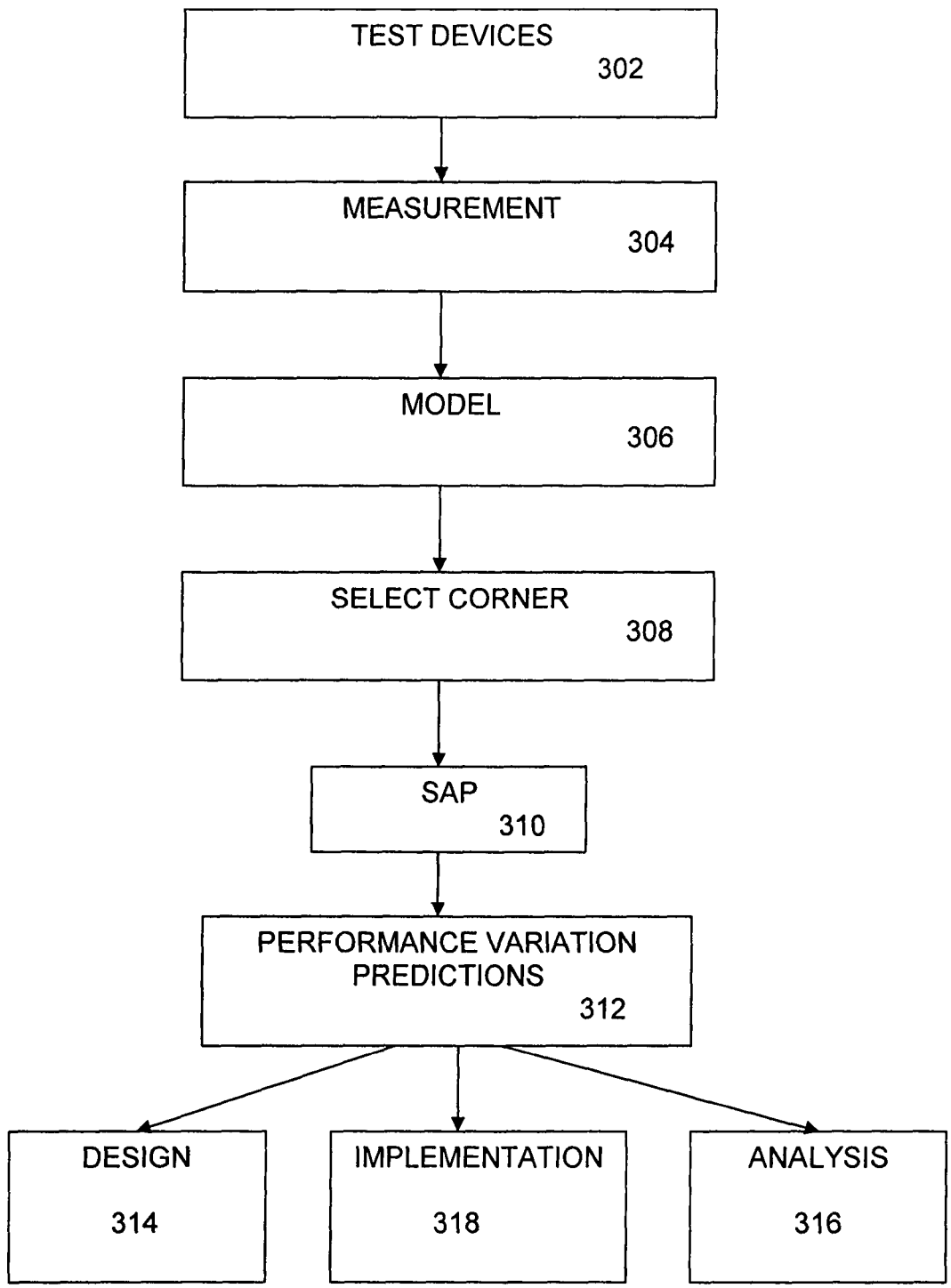
FIG. 3 is a second block diagram of an Integrated Circuit design and manufacturing process including a Stochastic Analysis Process (SAP), under an embodiment.

FIG. 3 is a second block diagram of an Integrated Circuit Design and Manufacturing Process including a Stochastic Analysis Process (SAP), under an embodiment that illustrates applicability various performance metrics. In the process of FIG. 3, after a new design is created, one or more performance metrics for a sample of test chips 302 are measured 304. A model 306 of the measurement results for a given performance metric (e.g., power, temperature, speed) is then developed. A corner value or values 308 are selected and the SAP method 310 is performed. The resulting performance variation predictions 312 are then utilized in one or more of the design 314 implementation 318 or analysis 316 stages to optimize the yield for the production batch of chips.

Figure 4:
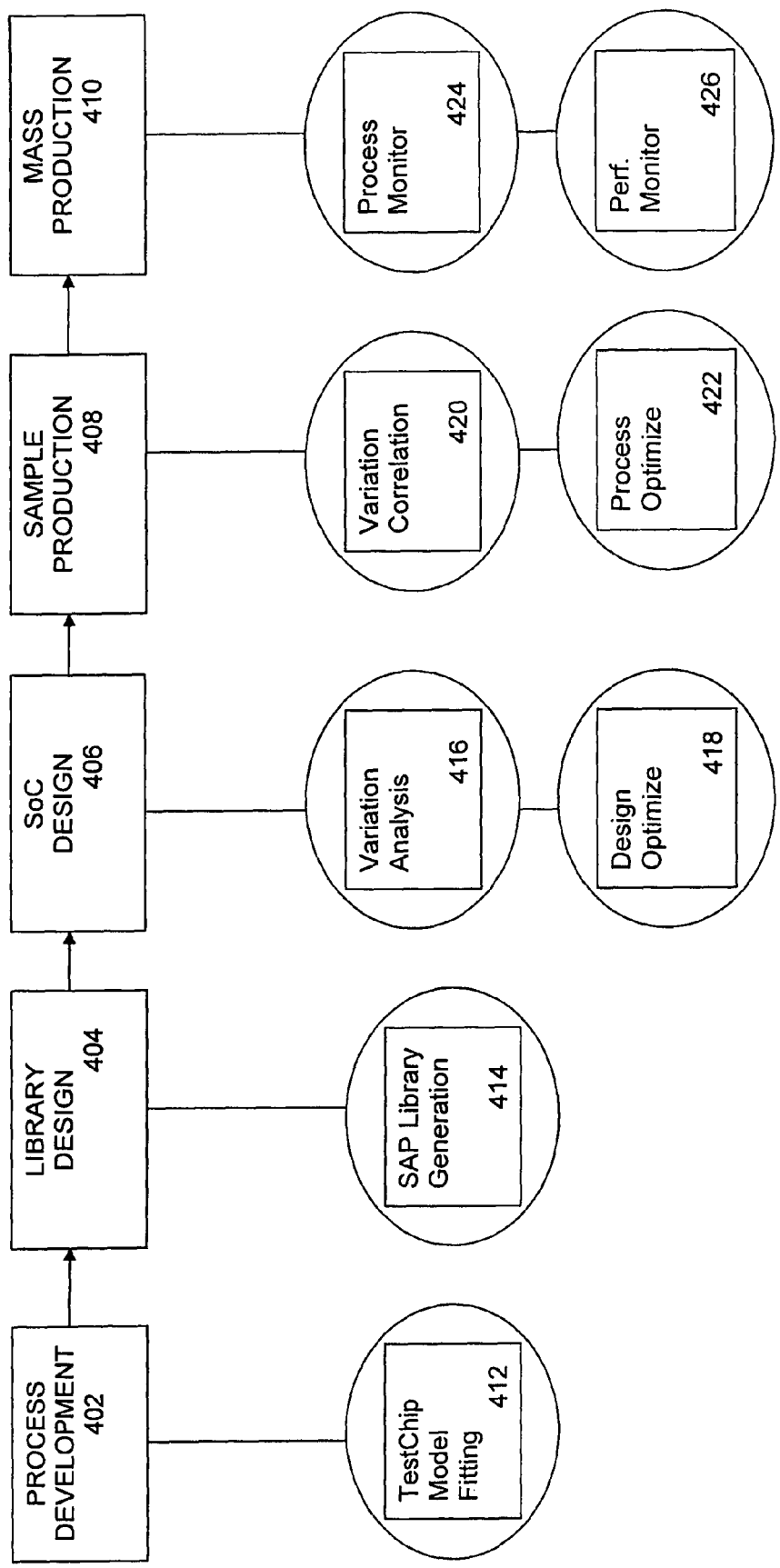
FIG. 4 is a block diagram of the production chain in an IC fabrication process that implements the SAP method, under an embodiment.

The SAP modeling process reduces unnecessary design margins and maximizes process potential. It also predicts the design variation for process parameters tuning and accelerates product yield ramp by linking the design-critical and process-critical parameters. FIG. 4 is a block diagram of the production chain in an IC fabrication process that implements the SAP method, under an embodiment. The process development stage 402 includes a test chip model fitting component 412. During the design process, a library of components is usually designed. The library design stage 404 includes an SAP library generation component 414. For a system-on-chip (SoC) design 406, variation analysis 416 and design optimization 418 components are included. A sample production run 408 is produced at which time variation correlation 420 and process optimization 422 steps are performed. During mass production 410 of the products, the process 424 and performance 426 metrics are monitored.

Figure 5:
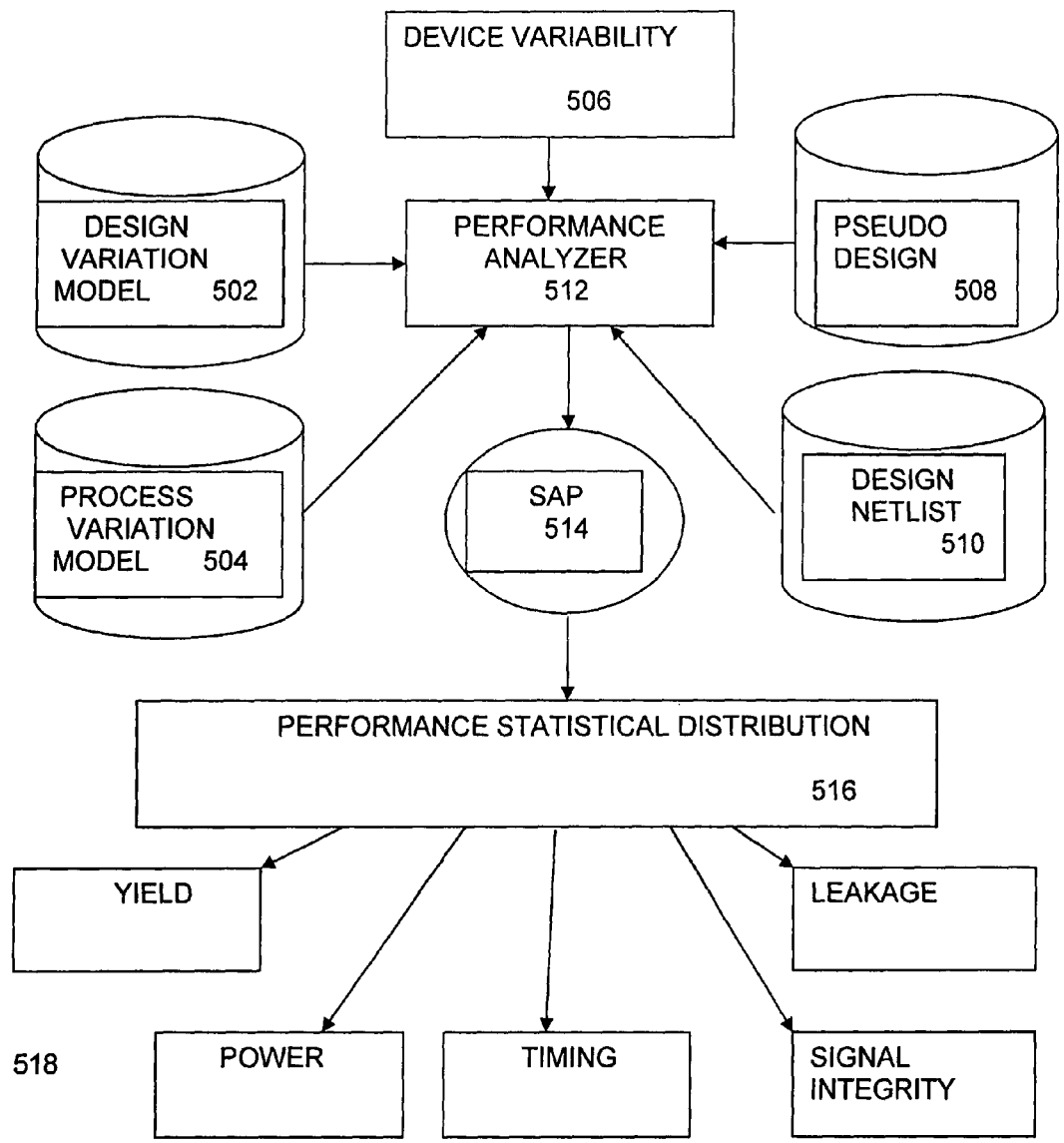
FIG. 5 is a block diagram that illustrates SAP as a component for performing statistical modeling of variations in IC manufacturing, under an embodiment.

FIG. 5 is a block diagram that illustrates SAP as a component for performing statistical modeling of variations in IC manufacturing, under an embodiment. A performance analyzer component 512 applies SAP modeling 514 on a number of different input processes and models to generate a chip performance statistical distribution 516. The inputs to the performance analyzer 512 include design variation models 502, process variation models 504 as well as device variability metrics 506. Actual design data such as a pseudo-design layout 508 and a design netlist 510 can also be processed by the SAP model 514. The statistical distribution 516 can provide variation information regarding many different aspects 518 of the chip operation and performance, including yield, power, timing, signal integrity, leakage, and other factors.

Figure 6:
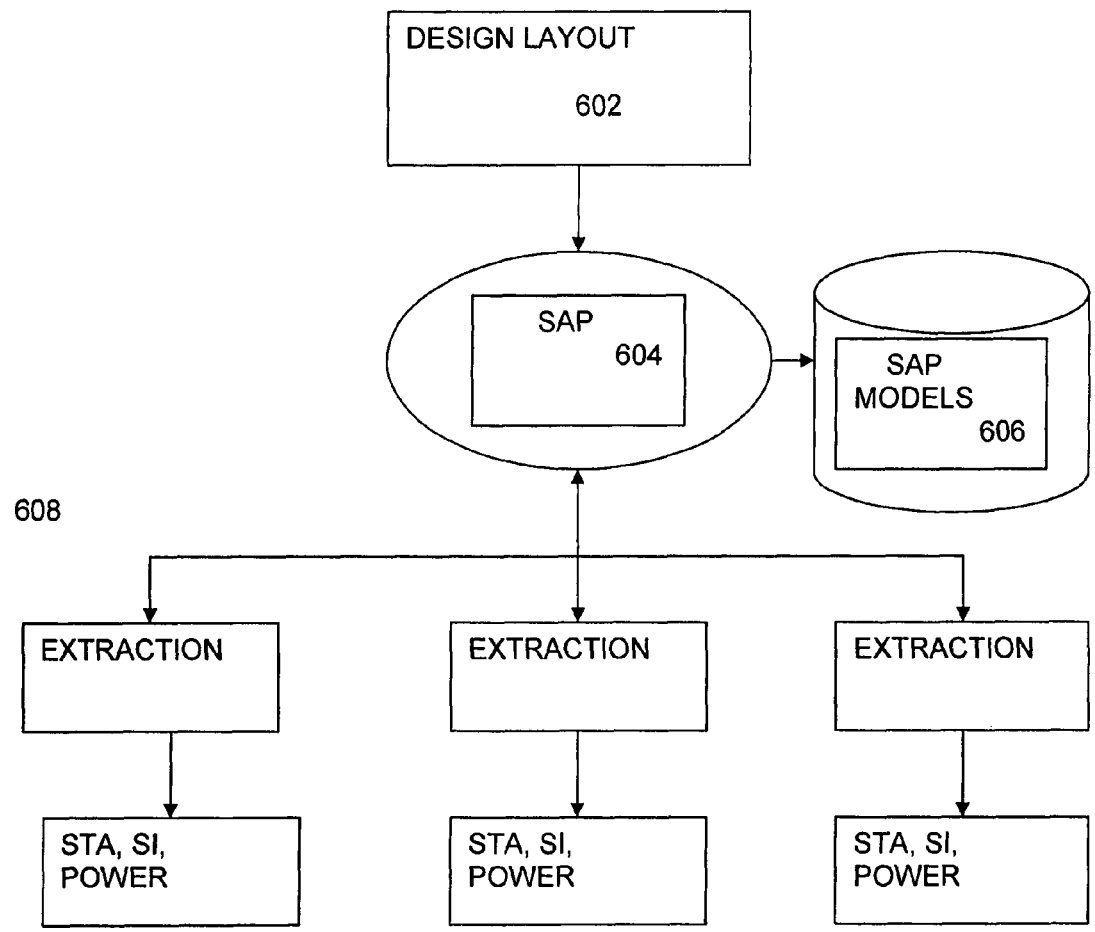
FIG. 6 is a block diagram that illustrates an SAP function in a design process, according to an embodiment.

FIG. 6 is a block diagram that illustrates an SAP function in a design process, according to an embodiment. The SAP module 604 is a circuit, software process, or any combination thereof that is functionally coupled to a design layout process 602. The SAP module 604 extracts sampling points, such as the three sampling points 608. The SAP module utilizes SAP models 606 to generate a graphical representation of the output distribution of the variation analysis.

Figure 7:
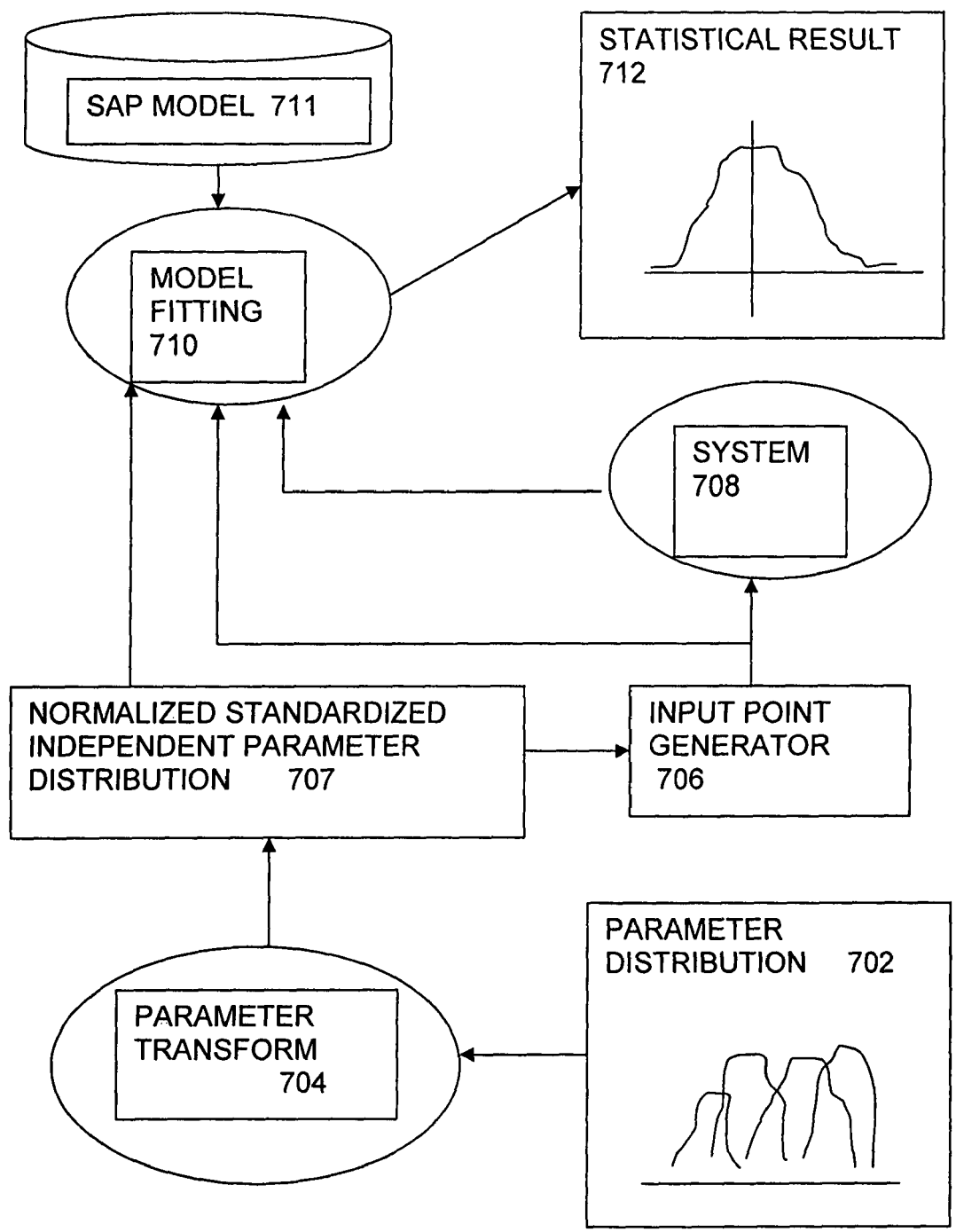
FIG. 7 illustrates the functional elements of an SAP component, according to an embodiment.

FIG. 7 illustrates the functional elements of an SAP component, such as SAP component 604 of FIG. 6, according to an embodiment. As shown in FIG. 7, the distribution or profiles of one or more parameters 702 is input into a parameters transforming module 704. Each parameter represents a characteristic that can alter the operation of system 708. One or more of the parameters may be correlated to other parameters. The parameter distribution typically provides the correlation between or among any of these parameters.

In one embodiment, system 708 represents any type of black box system, such as a simulation program, circuit, and the like that produces output values or signals in response to input values. A variation of the parameters 702 generally results in a variation of the output of system 708. The SAP model fitting process produces statistical output that represents the variation of the system output given variations of the parameters 702 using a significantly fewer number of sampling points than traditional methods, such as Monte Carlo analysis. If system 708 is an electrical circuit, parameters 702 can represent various device or environmental characteristics, such as interconnections, dimensions, temperature, voltage, and so on. Each curve of 702 can represent the variability for each parameter.

In one embodiment, the parameters transforming block 704 normalizes the form of the different parameters (which may have different variation formats) to facilitate the model fitting operation 710, and it also reduces the number of sampling points from the input 702. The parameters are transformed into normalized standardized parameter distribution values 705. The parameters transformation process 704 also decomposes any correlation between any of the parameters in the creation of the normalized standardized independent parameter distributions. These normalized distributions are used by input point generator 706 to determine the sampling points to be input to system 708. In one embodiment, the exact input points are generated by the method described above with respect to the generation of SAP input samples.

The execution of system process 708 on the input points results in the generation of a result data set. This data is input into the model fitting process 710 along with the original input points and the normalized standardized independent parameter distribution values. The model fitting process 710 utilizes SAP model 711 to generate a statistical result 712. The results of the system 708, as well as the transformed parameters are model fitted 710 to produce an output distribution curve 712 that describes the behavior of the system based on the variation of the parameters 702. For a system that has sufficient granularity and processing power, the outline of output curve 712 should match the profile of the input distribution 702. In one embodiment, The input point generator 706 selects the highest possibility points from the total number of input sampling points 702. This sample policy generates the subset of sampling points that are processed by the model fitting component 710.

The SAP model illustrated in FIG. 7 employs an orthogonal polynomial based approximation technique. This technique obtains an analytical equation of the characteristic being modeled (e.g., delay or power) in terms of the uncertain parameters. The output is expressed in terms of inputs using orthogonal polynomials. The unknown coefficients in the output expression are estimated using SAP method.

The system 708 performs data de-correlation operations by principal component analysis. A linear transform to zero correlation is performed with the new parameters and Gaussian or raw sample data can be used. Variables are reduced by eliminating small or zero variance terms. These steps are generally performed using the SAP methods described above.

Figure 8:
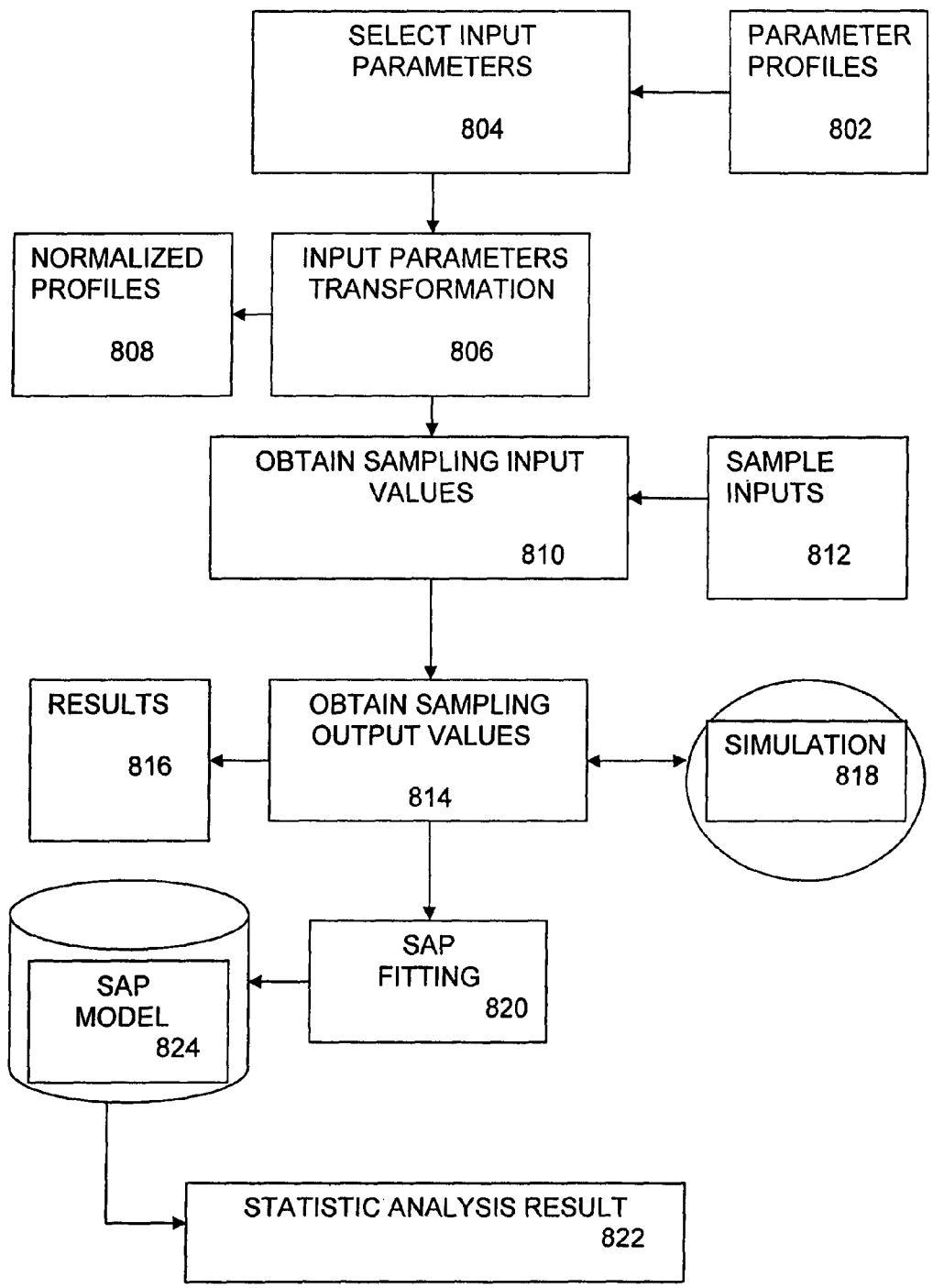
FIG. 8 is a flow diagram that illustrates a method of performing the parameter transformation and SAP modeling of FIG. 7, under an embodiment.
Figure 10:
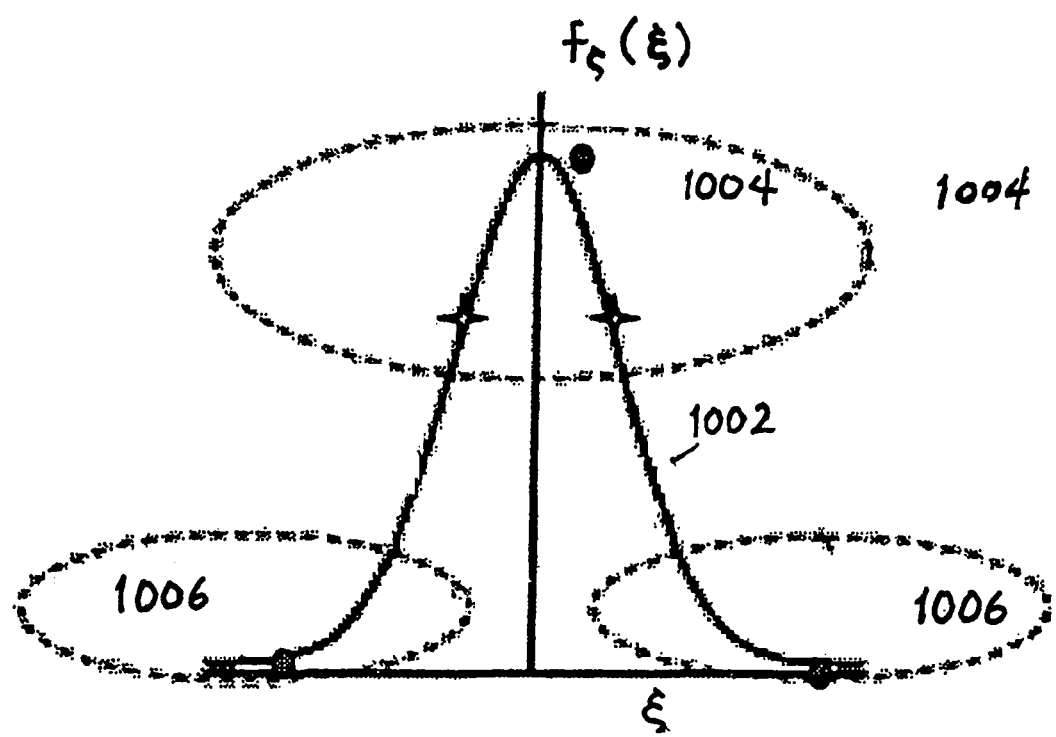
FIG. 10 illustrates a process of selecting sampling points, under an embodiment.

FIG. 8 is a flow diagram that illustrates a method of performing the parameter transformation and SAP modeling of FIG. 7, under an embodiment. The process of FIG. 8 begins with a selection of input parameters 804 from a list of parameter profiles 802. The parameter profiles (or parameter distributions) list the one or more sources of variability to be modeled by the system. The input parameters are transformed 806 using normalized profiles 808. The transformed parameters are then used to obtain sampling input values 810. The process of selecting sampling points is illustrated in FIG. 10, under an embodiment. Sampling (or collocation) points are selected from the roots of the function 1002 and the highest probability region 1004. Third-order Hermite polynomial roots can be selected for second-order fitting at the collocation points SQRT3, 0, SQRT3.

The sampling input values are used as sample inputs 812 to a simulation process 818 to obtain 814 sampling output values 816. The sampling output values are then used in a SAP fitting operation 820 that is modeled using SAP module 824 to obtain the statistic analysis 822.

Figure 9:
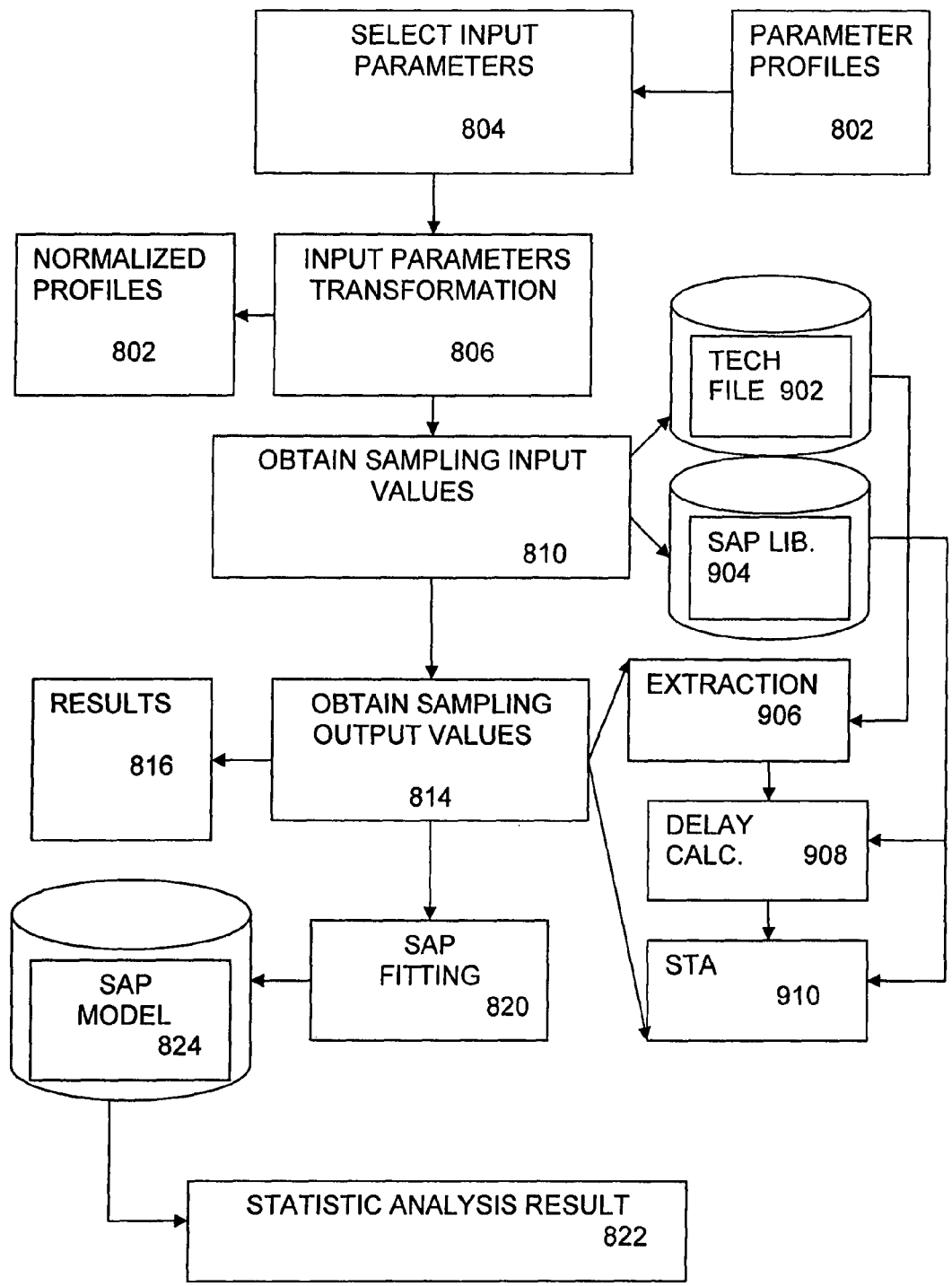
FIG. 9 is a block diagram that illustrates an example of the application of the SAP modeling method of FIG. 8 to a simulation for a design process, under an embodiment.

FIG. 9 is a block diagram that illustrates an example of the application of the SAP modeling method of FIG. 8 to a simulation for a design process, under an embodiment. In system of FIG. 9, the sample inputs for which the input values are obtained in step 810 are provided by technology files 902 and SAP library 904. The technology files 902 define the extraction input. The SAP library 904 are industry-standard library files. In one embodiment, the process of 906 to 910 is a parasitic extraction process for performing static timing analysis (STA) 910 to simulate or measure the speed behavior of the system by measuring resultant delays 908. For example, the tech files and libraries allow a user to extract various characteristics of the circuit, such as circuit resistance/inductance/capacitance values from physical parameters, such as wire dimensions, geometries, materials, and so on. Thus, for the example of FIG. 9, the SAP process uses the files 902 and libraries 904, and the simulation process involves extraction process 906, and calculations for performance metrics, such as delay 908, power, and so on.

As described above, FIG. 10 illustrates the selection of sampling (collocation) points utilized in the system of FIG. 7, under an embodiment. In general, the number of collocation points required is equal to the number of unknown coefficients in the series expansion. For higher dimension systems and higher order approximations, the number of available collocation points is always greater than the number of collocation points needed, which introduces a problem of selecting the appropriate collocation points. In one embodiment, there are two criteria for collocation point selection, and the two criteria are executed in sequential order.

The first criterion is for a single input or single random variable. Each random variable $\xi$, chooses mean, max, and min as collocation points because these points represent the highest probability and the deviation of the distribution. Since the number of collocation points may exceeds the number of coefficients needed to be solved, the points that have higher probability are selected as collocation points.

The second criterion is for a multiple input or multiple random variable. Here, it is assumed that there are m inputs or m random variables. As with criteria 1, collocation points are selected for each random variable. If each random variable has q collocation points, then there are $q^m$ collocation point sets. The number of collocation point sets to the number of unknown coefficient $a_i$s in the following equation:

$$y=a_0+a_1\xi_1+a_2\xi_2+a_3(\xi_1^2-1)+a_3(\xi_2^2-1)+a_5(\xi_1\xi_2)$$

For example, to evaluate $a_0$, the point (0, 0) is selected as a collocation point. In this case mean of $\xi j$ is zero. To evaluate $a_1$, select ($\xi_{1cl}$,0) as a collocation point, where $\xi_{1cl}$ is a non-zero root of 3rd degree orthogonal polynomial. To evaluate $a_2$, (0, $\xi_{2cl}$) is selected as a collocation point. Similarly, for each term in the above equation, if it involves two or more random variables, the collocation points of the corresponding variables are selected as non-zero roots. If a tie exists within a set of collocation points, points which are closer to the mean are preferred since they fall in region of higher probability, as shown in FIG. 10. If the tie is still unresolved, the collocation points are picked such that the distribution of the selected collocation points is close to symmetric around the mean. For any further tie, the points are picked randomly.

SAP Scaling

Figure 11:
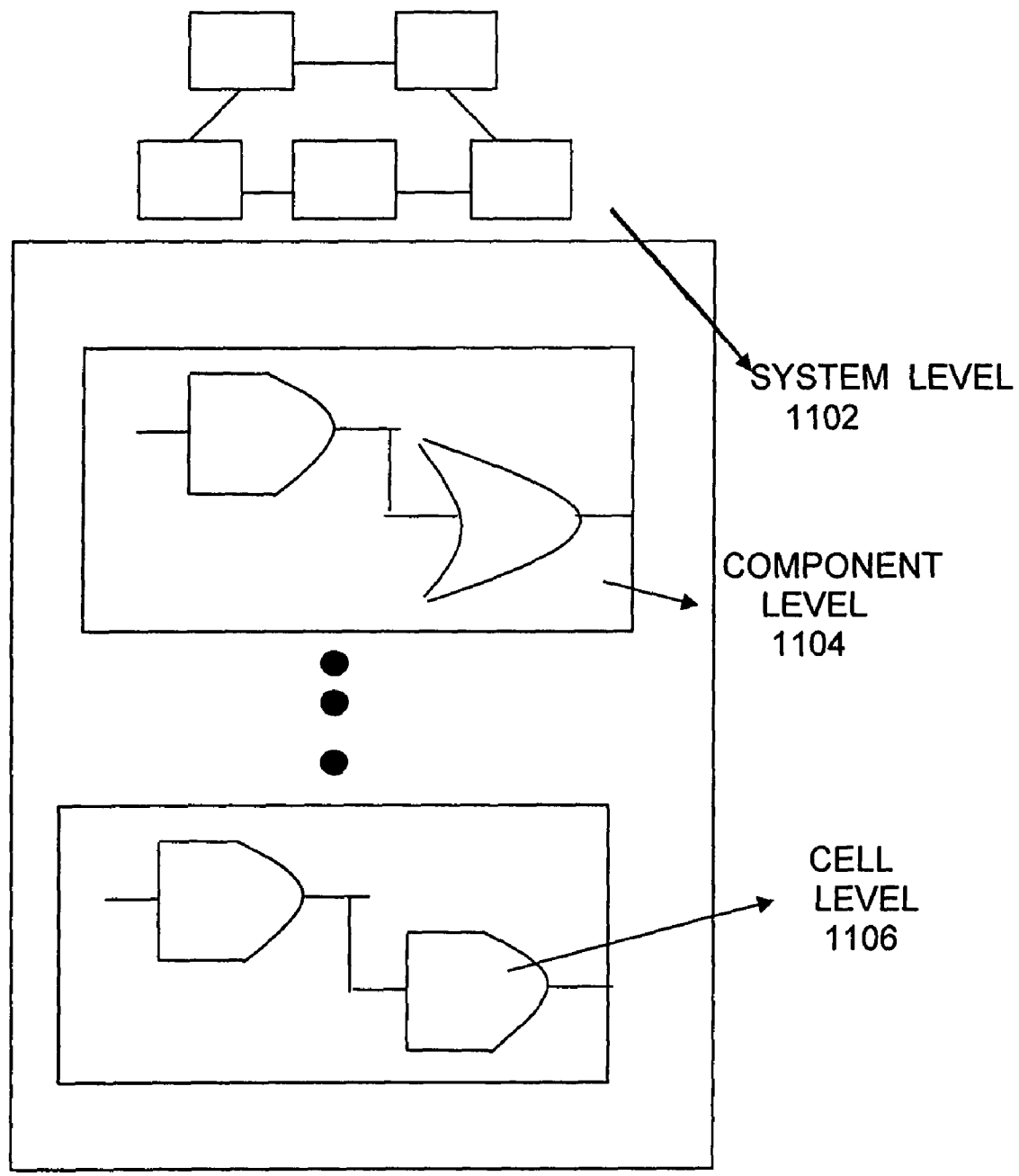
FIG. 11 illustrates a recursive application of a SAP model for various design scales, under an embodiment.

In one embodiment, the SAP method is applied recursively across a hierarchical structure to bring quantum level resolution to the system level. FIG. 11 illustrates a recursive application of a SAP model for various design scales, under an embodiment. As shown in FIG. 11, the SAP method can recursively and implicitly call their own functions in a cascading manner down the system design scales, such as from system 1102 to component 1104 to cell/gate 1106.

The following program listing is an example of pseudo-code for a SAP model at the system level, under an embodiment.

```
Performance = SAP(w, L, Temperature, ...) % system level call
{
    If not library cell
{
   ... .....
        component1_performance= SAP(w,L, Temperature,...);
            % component level call
        component2_performance=SAP(w,L,Temperature,...) ;
            % component level call
        ... .....
        performance = component1_performance + component2_performance+...;
        call SAP_model_construction (performance, w,L,Temperature);
        return SAP_model and Performance at system level;
    } else { % cell level and SAP model already exist
        cell1_performance = SAP_AND(w,L,Temperature);
            %assume cell is an AND gate
        cell2_performance = SAP_OR(w,L,Temperature);
            %assume cell is an OR gate
        .....
        performance = cell1_performance+cell2_performance+ ...
        return SAP_model and performance at component level
    }
}
```

On a first application at the system (or chip) level the SAP subroutine calls on the SAP model for each of the system's components. The SAP model at component level, in turn, calls the SAP model at the cell/gate level. The component level timing and power depend of the timing and power of all the component's cells/gates. In one embodiment, the SAP models for the cell/gate library have already been built analytically. Quantum level simulators may be used to provide a precise form of the SAP cell/gate-level analytical equation that yields the timing and power from the input temperature, the geometry parameters of interconnects and devices, and the input signal delays.

The "golden data" that stems from the SAP cell/gate model enables the construction of the SAP component model. The same gate-component cycle repeats at the component-system level to yield a SAP system model. In both cycles, quantum level simulators such as SWEC provide the golden data that is critical for the construction of the model at the successive, larger scale. It is therefore possible to proceed from cell/gate level performance (SWEC analytical equation) to component level performance and finally to system level performance. In summary, the component level timing and power is a function of the timing and power of all the component gates. The golden data that stems from the SAP gate model enables the construction of the SAP component model. The same gate-component cycle repeats at the component-system level to yield a SAP system model. In both cycles, quantum level simulators such as SWEC provide the golden data that is critical for the construction of the model at successive scales.

Figure 12:
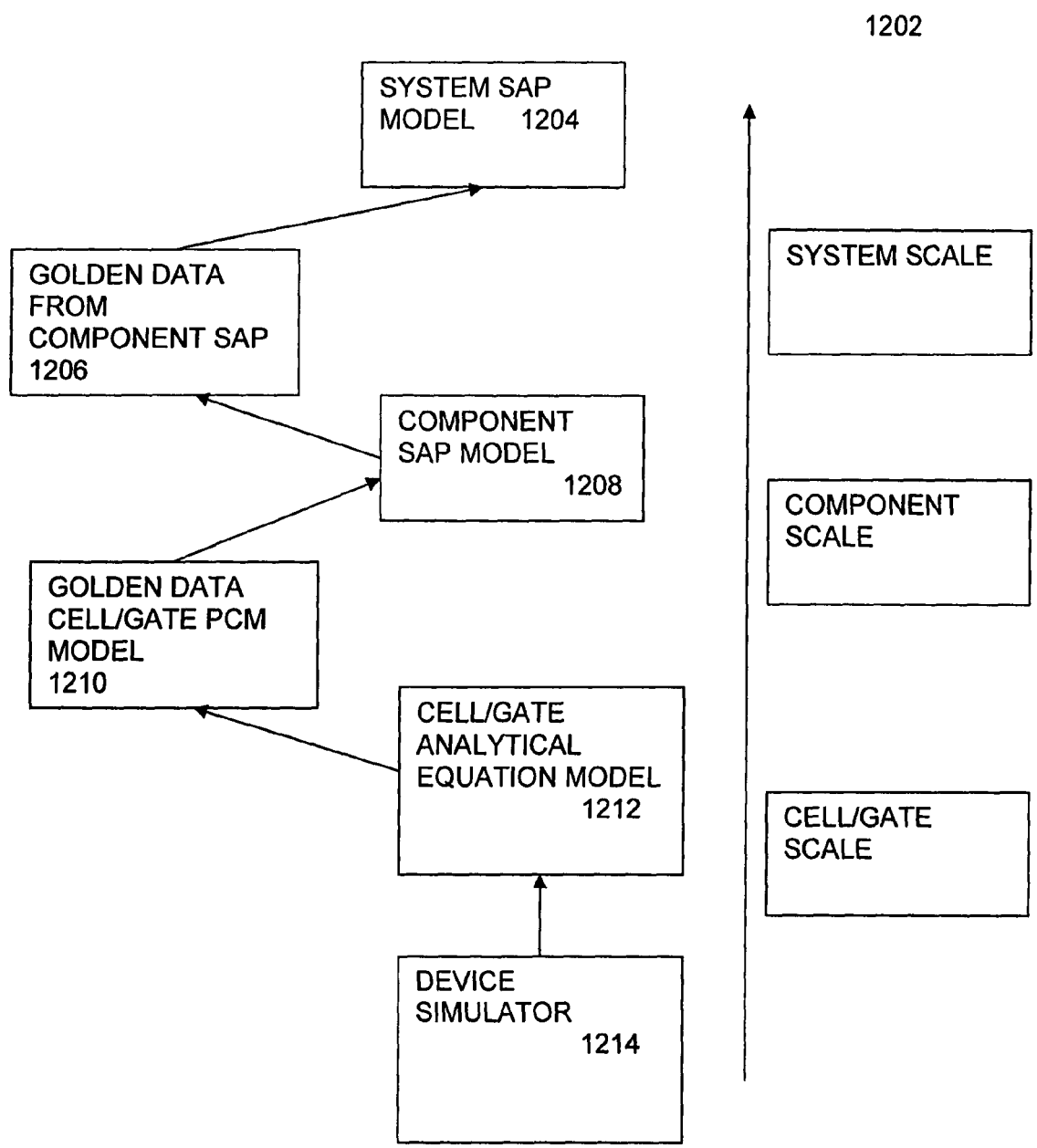
FIG. 12 is a flow diagram that illustrates the construction of SAP hierarchical models across the design scales illustrated in FIG. 11, under an embodiment.

FIG. 12 is a flow diagram that illustrates the construction of SAP hierarchical models across the design scales illustrated in FIG. 11, under an embodiment. For each level of the system-component-cell scale 1202, golden data and appropriate SAP models are applied to provide the construction of the model at the appropriate level. As shown in FIG. 12, at the cell/gate scale, a cell/gate SAP analytical equation model 1212 (which may take input from an quantum effect device simulator 1214) is applied to the cell/gate SAP model 1210. This, in turn, is used by the component SAP model at the component scale. The component SAP model 1208 generates the component SAP golden data 1206, which in turn, can be used by the system SAP model 1204 at the system scale.

In one embodiment, the output of the recursive SAP model is the system level analytical equation in terms of w, L and Temperature (assuming these are the variables being modeled). This top down recursive procedure automatically identifies the collocation points of w, L and Temperature for the system level performance or system response surface. Moreover, since the resulting system level SAP model is a function of temperature, when temperature changes, it predicts the power fluctuations without full-chip power analysis. The recursive framework can be further extended to future new device based designs by only replacing the current level simulator (e.g., SPICE) with nanodevice or molecular level simulators. The resulting system level SAP model will have molecular level resolution.

The SAP approach described herein can be applied to several aspects of circuit performance such as timing flow in VLSI (Very Large-Scale Integration) circuits. For timing calculations, the system provides the SAP formula of processes for each endpoint of the circuit. These endpoints normally contain clock tree, clock pins, data pins, set/reset pins. First, the SAP formula of arrival time for each "end-point" is derived, then Clock Skew Analysis and Slack Time analysis can be performed. In addition, a Robustness test can be also applied on the results. Other applications of SAP to VLSI and ULSI circuit design include modeling thermal and power properties of the design, and multiple input switching effects and process variations.

As stated above, embodiments of the SAP process described herein can be applied to simulating various aspects of an IC device. One such application is analysis of clock skew. In traditional clock skew analysis, for any time domain, the maximum clock skew is obtained by computing the maximum and minimum arrival time from each end clock point, and then finding the clock skew from the formula: clock skew=Max AT−min AT.

In the statistical area, a distribution instead of a single value will be determined from the SAP analysis. Given any two points, the skew SAP formula can be represented by:

$$\text{skew}(p_1 \sim p_n)_{SAP} = AT_1(p_1 \sim p_n)_{SAP} - AT_2(p_1 \sim p_n)_{SAP}$$

However, due to the large number of time domain endpoints, computing the distribution pair by pair is not feasible. Therefore, the method involves providing four heuristic methods to get the maximum skew distribution.

For Heuristic 1, the following steps are performed: (1) find the end point with maximum mean(constant term in SAP formula) arrival time; (2) find the end point with minimum mean (constant term in SAP formula) arrival time; (3) choose the end point pair from A, B.

For Heuristic 2, the following steps are performed: (1) find the end point with maximum mean plus standard deviation arrival time; (2) find the end point with minimum mean minus standard deviation (constant term in SAP formula) arrival time; (3) choose end point pairs from the M by M groups of the A, B pairs.

For Heuristic 3, the following steps are performed: (1) find first M end points with maximum mean (constant term in SAP formula) arrival time; (2) find first M end points with minimum mean (constant term in SAP formula) arrival time; (3) choose worst end point pairs from A,B's M by M groups For Heuristic 4, the following steps are performed: (1) find first M end points with maximum mean plus standard deviation arrival time; (2) find first M end points with minimum mean minus standard deviation (constant term in SAP formula) arrival time; (3) choose worst end point pairs from A,B's M by M groups.

The reason to choose more points rather than to use single point for maximum or minimum is that if the skews have common factors, the total distribution would be different. Thus, the top M (kind of 5-10) candidates are kept for both maximum and minimum groups, and they are compared one-by-one. To get the distribution, a Latin Cubic method or Modified Monte Carlo method working on skew SAP formula can be used. From the distribution, the user can specify various factors, such as for given percentage coverage (e.g., 80%), what is the max the max skew; or for a given skew tolerance, what is the percentage coverage of the whole possible products. It is also possible for users to divide the CDF-axis into segments and get different performance from them. For binning the product, the user can set a bin boundary (max-min). From the CDF value, it is then possible to determine the percentage of products would fall into the catalog.

Another example of SAP application is performing slack time analysis. The traditional timing setup check is to compute the slack from following formula:

Slack=Required time (for clock pin)−Arrival time (for data pin) Required time=Clock period−Setup time+Arrival time (for clock pin)=>Slack=Clock period + Arrival time (for clock pin)
− Arrival time (for data pin)
− Setup time
− Setup Time Margin The hold time check is determined from:

Slack=Arrival time (for data pin)−Required time (for clock pin) Required time=Hold time+Arrival time (for clock pin) Slack=Arrival time (for data pin)

− Arrival time (for clock pin)
− Hold Time
− Hold Time Margin

It should be noted that in STA terminology, the clock pin would be called the reference pin, and the data pin would be called the constrained pin.

In one embodiment, the SAP method described herein allows the derivation of and SAP formula. The SAP formula can be substituted into the above formulas to determine the slack time. The slack SAP formula is function of processes variables.

$$\text{slack}(p_1 \sim p_n)_{SAP}$$

So, for each timing check points (constrained), there will be this slack. To get the distribution, the Latin Cubic method or Modified Monte Carlo method can be used in conjunction with the skew SAP formula. The CDF for all constrained points can be constructed and applied in several applications.

For example, for a single constrained points, normally the worst critical path end-points by traditional STA, the slack distribution can be used to determine the following: for given percentage coverage (80%), what is the slack; or for a given slack tolerance, what is the percentage coverage of the whole possible products. Users can divide the CDF-axis into segments and get different performance from them. For binning the product, the user can set bin boundary (max-min). From the CDF, it is possible to determine the percentage of products would fall into the catalog.

Another application will be applied on all constrained points' slacks. For a given coverage percentage (e.g., 90%), slack numbers can be determined for each constrained point. Therefore, the slacks can be re-sorted, and the critical paths determined. Due to the sensitivity difference for each path, the ranking will be different from each coverage percentage selected.

Another application example involves robustness tests. The manufacture of IC's is not a static process, it always contain variations, and these variations are also changing with time. The best manufacturers can do is keep their process stable. In stable process control, the process parameters are monitored as SPC (statistical process control) charts, or Cpk (process capability measure). In general, those processes parameters will not changed very much under process control. However, the mean shifting and variation changing a little bit is very normal. So, a good product in the process might have variations, and these variations might change from time to time.

The robustness test is used to test the product's robustness against process variations. The main issues are the expected process parameter distribution would be changed. And the distribution of results would be changed accordingly.

Using the SAP methods described herein, users can perform robustness test on both skew analysis and slack analysis. The basic idea behind these is to reuse the SAP formulas. While parameter distribution changed a little bit, the SAP formulas can be re-formed from original SAP, and the new distribution can be tested to determine whether or not it meets the specification.

Alternative embodiments, variations, and/or modifications of the SAP include, but are not limited to finding sampling points based on roots of orthogonal polynomials of the performance expansion, generating sampling points based on roots of moment expansion, using different tools to generate golden data, Statistical Response Surface Method (SRSM) which finds the collocation points (or sampling points) as the roots of polynomials, and any orthogonal polynomials (such as Hermite) associated with response surface method.

Hierarchical SAP

In one embodiment, the SAP process comprises a hierarchical SAP process in which individual SAP operations are treated as sub-level instances that are combined to produce an integrated top-level SAP process. Each of the sub-level SAP operations feature reduced component parameters to optimize their operation. This approach generally operates much faster (e.g., 10× faster) than a single flat SAP operation, and is generally as accurate as, or within only a couple of percent points of accuracy to a single flat SAP operation.

Figure 13:
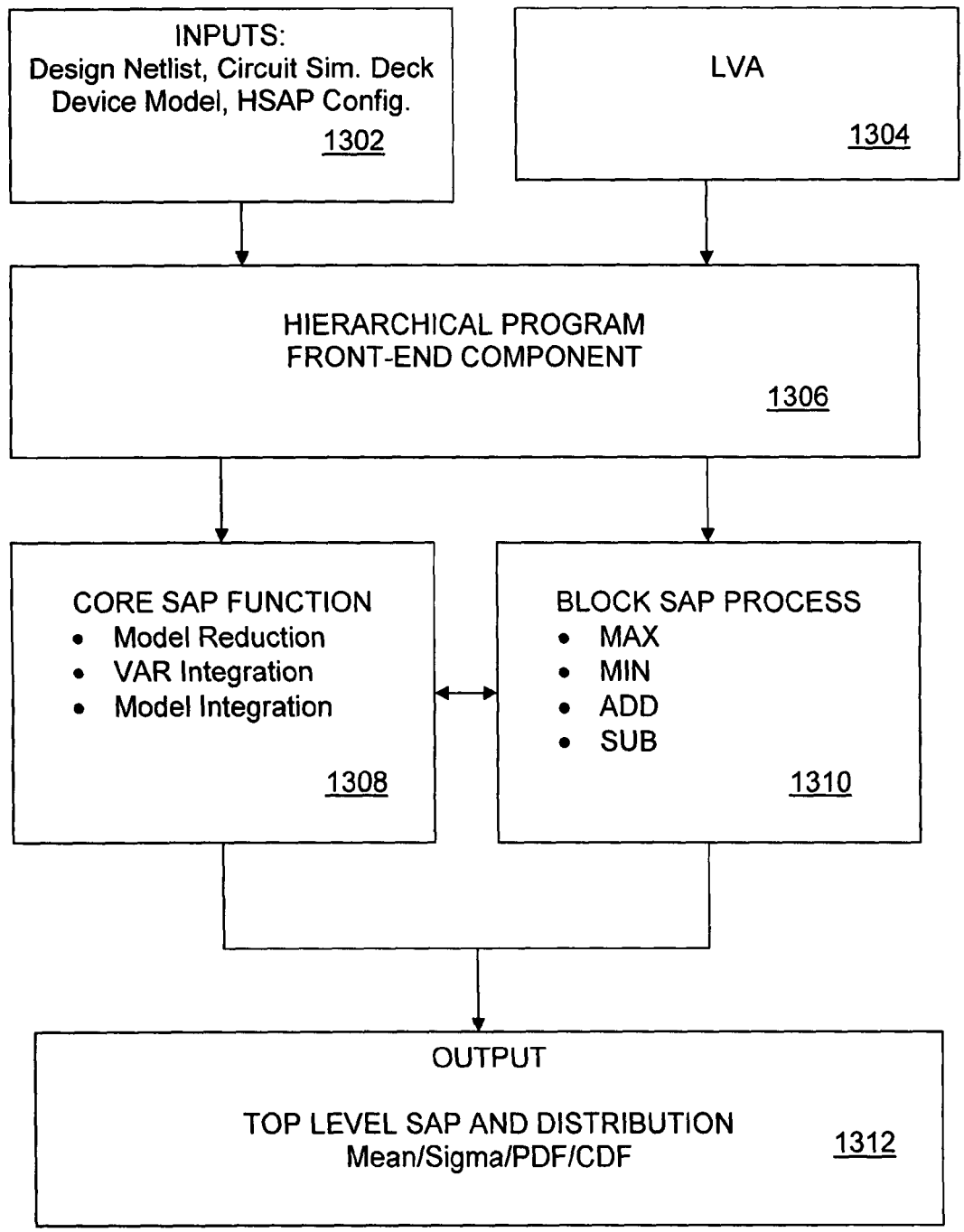
FIG. 13 is a block diagram of a hierarchical SAP module under an embodiment.

FIG. 13 is a block diagram of a hierarchical SAP module under an embodiment. The overall system 1300 comprises a front-end process 1306 that receives as inputs various different data elements, such as inputs 1302 including a design netlist that can be a DSPF, flattened on the cell-level, as well as a top-level circuit simulation deck. Other inputs can include subcircuit and device models and libraries, variation definitions, common parts of a sub-level circuit simulation deck, and an HSAP (Hierarchical SAP) configuration file. The front-end component 1306 interfaces to two main modules, a core SAP function component 1308 and a block SAP process 1310. The core SAP function 1308 contains functions that reduce and integrate the circuits of the design through certain model reduction and integration function calls. The block SAP operation 1310 performs an overall SAP operation on the reduced and integrated design circuits through certain operations, such as Max/Min/Add/Subtract. The outputs 1312 of system 1300 include a top-level SAP and its distribution (Mean/Sigma/PDF/CDF).

Figure 14:
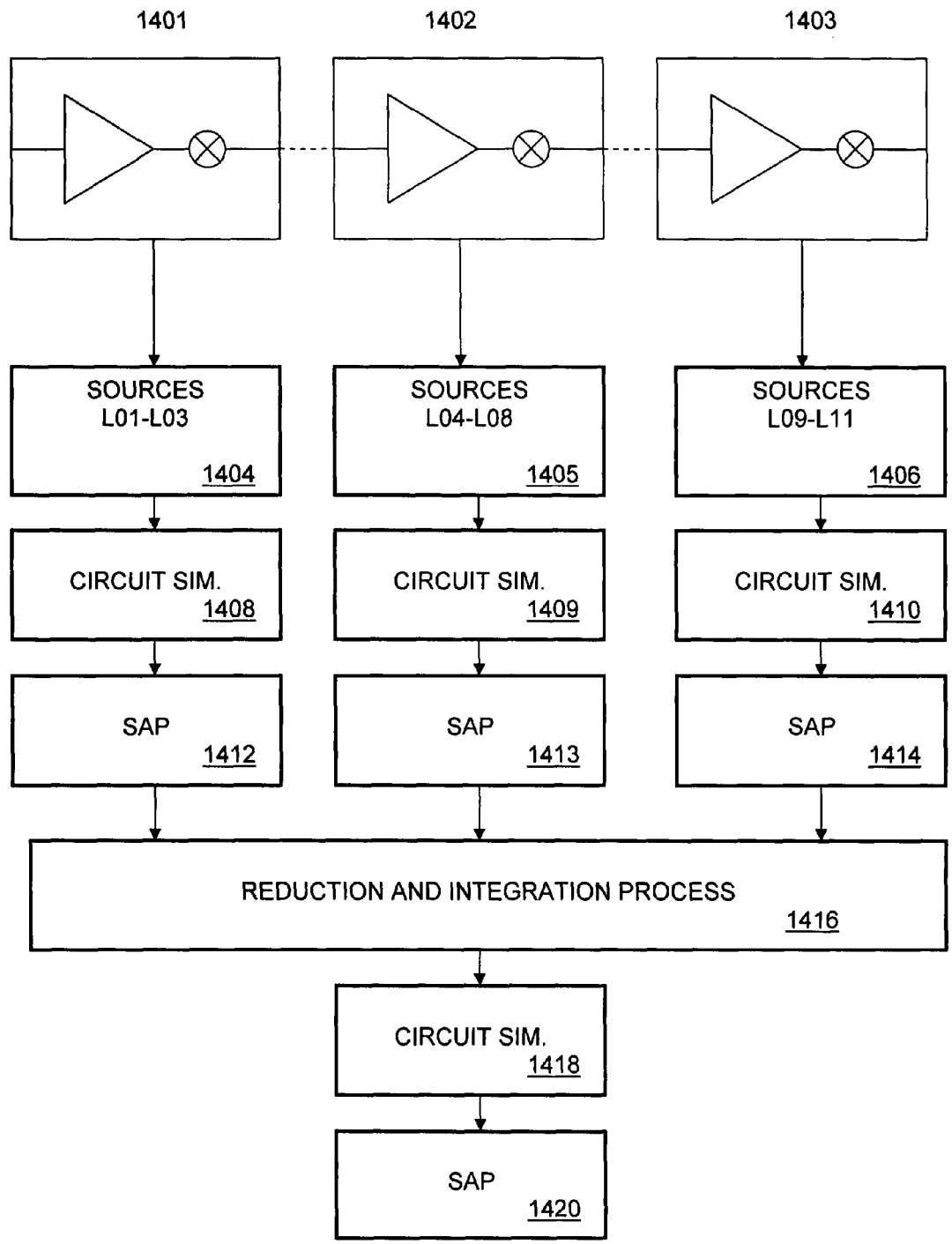
FIG. 14 illustrates the breakdown of circuit elements in a hierarchical SAP analysis process, under an embodiment.

In a traditional flat SAP analysis, a circuit comprising a number of serial and/or parallel devices or circuit elements is broken down, as a whole, into a number of source parameters such as L01-L03 (lines 1-3), L04-L08, L09-11, and so on. These parameters are executed as an entire set in an circuit simulation modeling operation and subsequent SAP operation. FIG. 14 illustrates the breakdown of circuit elements in a hierarchical SAP analysis process, under an embodiment. As shown in FIG. 14, the overall circuit or sub-circuit is broken down into a number of components 1401-1403. Each component comprises a single device or simple group of devices or circuit elements. From each individual component is derived one or more sources 1404-1406. Thus, sources L01-L03 correspond to circuit component 1401, sources L04-L08 correspond to circuit component 1402, and sources L09-L11 correspond to circuit component 1403 for the example of FIG. 14. In the traditional flat SAP analysis, all of the circuit components and source parameters L01-L11 would be analyzed together. In the hierarchical system of FIG. 14, each individual set of sources 1404-1406 is analyzed in a separate respective circuit simulation step 1408-1410. The output of each circuit simulation is then analyzed in a separate respective SAP operation 1412-1414. The results of each SAP operation are then processed in a reduction and integration operation 1416. This results in an intermediate set of values R1 to RN for N different circuit components (e.g., R1, R2, and R3). These intermediate values are then processed through a single circuit simulation step, 1418, and the results are then processed in a single SAP operation 1420. The reduction and integration process 1416 determines the number of sampling points for the circuit simulation 1418 and SAP 1420 steps.

Figure 15:
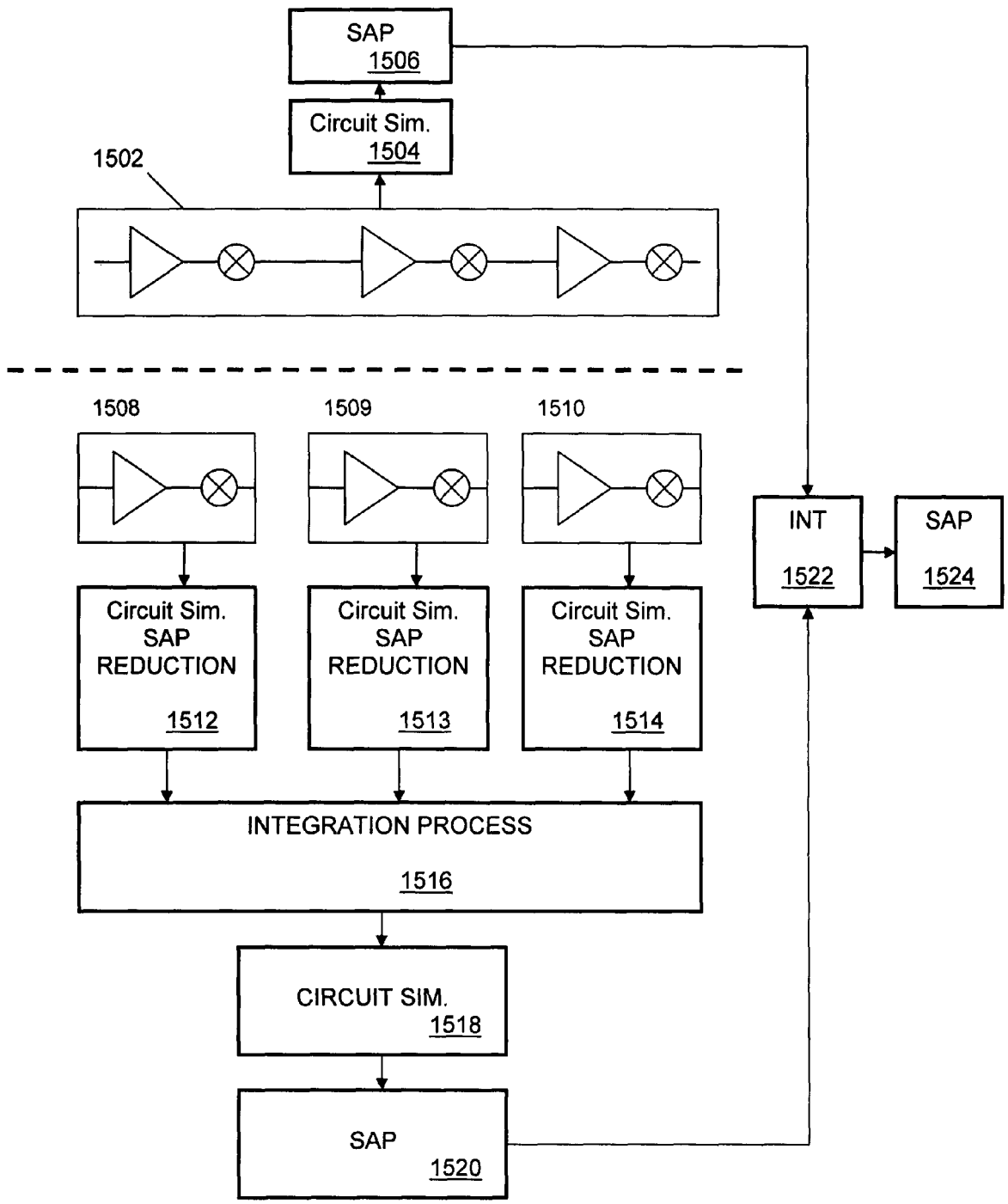
FIG. 15 illustrates a combination flat and hierarchical SAP analysis on a multi-component circuit, under an embodiment.

The hierarchical SAP process can be combined with global or flat SAP analysis processes to produce an integrated SAP process that includes components of these different SAP components. FIG. 15 illustrates a combination flat and hierarchical SAP analysis on a multi-component circuit, under an embodiment. As shown in FIG. 15, a multi-device circuit 1502 is analyzed using a single circuit simulation process 1504, which in turn is analyzed by a single SAP process 1506. The circuit 1502 as a whole is broken down into a single set of sources, which are analyzed as a complete set. This is a flat SAP process as all of the devices of circuit 1502 are analyzed through these single processes. This can represent a global analysis on the circuits of the system. A local analysis may be executed using the hierarchical analysis process. Thus, as shown in FIG. 15, the overall circuit is broken down into a number of components 1508-1510. Each individual component is broken down into respective sets of sources, which are then analyzed in separate respective SPICE, SAP, and reduction steps 1512-1514. The output these steps are then processed in an integration operation 1516. This results in intermediate values R1 to RN, which are then processed through a single circuit simulation step, 1518, and the results are then processed in a single SAP operation 1520. The results of both the global analysis and the local analysis are then integrated in integration process 1522 and an SAP analysis step 1522 is performed on the integrated results. This results in a sampling of data points for both the circuit as a whole (global) and each individual device or sub-circuit separately (local) in a single SAP operation.

Figure 16:
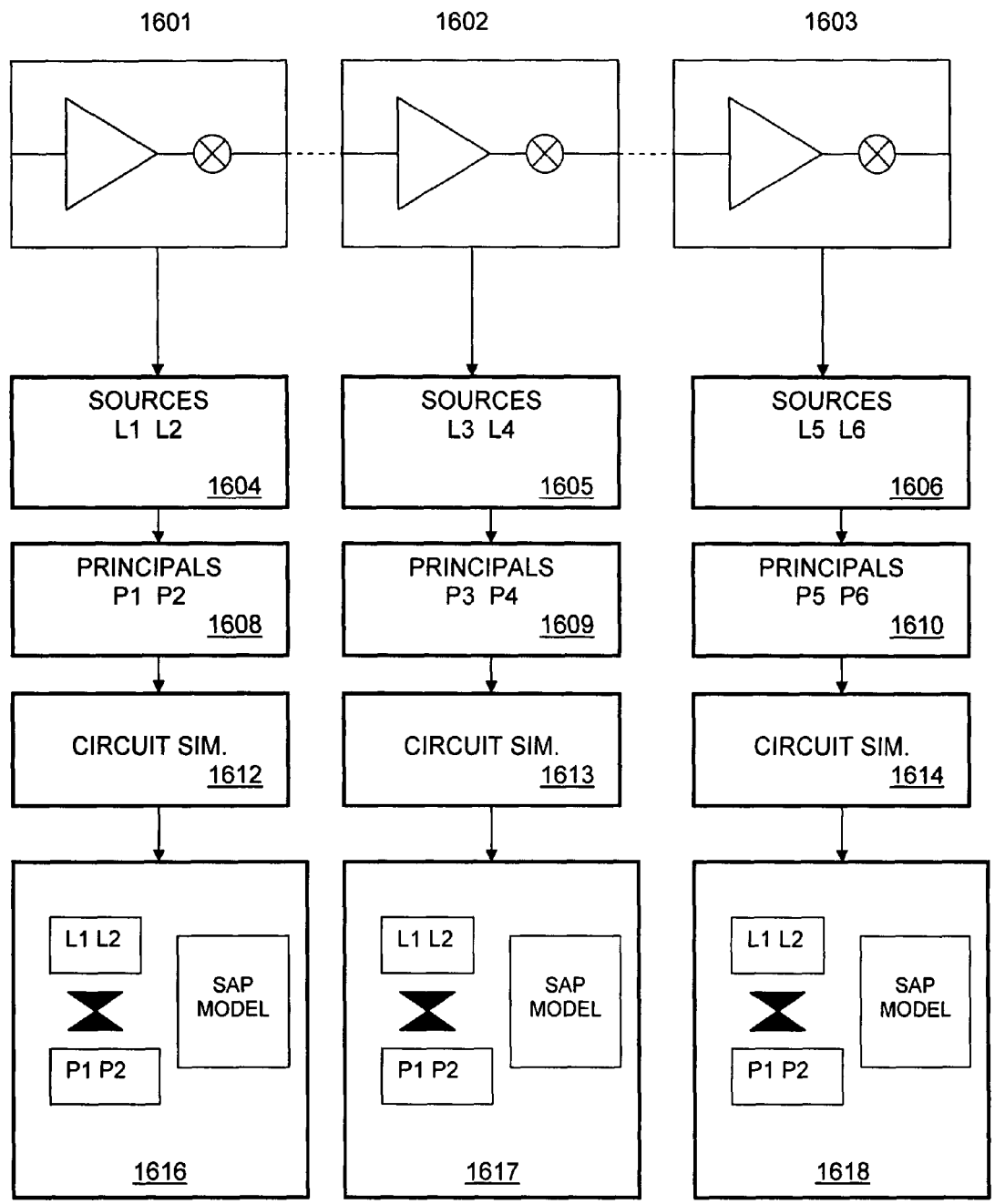
FIG. 16 illustrates sources and corresponding principals for individual circuits in a hierarchical SAP analysis process, under an embodiment.

In one embodiment, the hierarchical SAP process can be used for local random level SAP analysis. In this case, the source or sources for each device component are used to derive corresponding principals. The principal components represent a reduction of the possible components or sources of each circuit component to the main or critical components. Thus, for the example of FIG. 14, sources L1 and L2 create principals P1 and P2, sources L3 and L4 create principals P3 and P4, and so on. These principal values are then processed through individual circuit simulation processes to derive a first simulation based on relatively few sampling points each. The use of principals reduces the number of sampling points and facilitates fast simulation. The SAP model is then derived for each of the L and P pairs. This is illustrated in FIG. 16, in which a number of individual circuits 1601-1603 are broken down in to corresponding sources 1604-1606 and corresponding principals 1608-1610. These are then processed in individual circuit simulation operations 1612-1614 and SAP modeling components 1616-1618.

Figure 17:
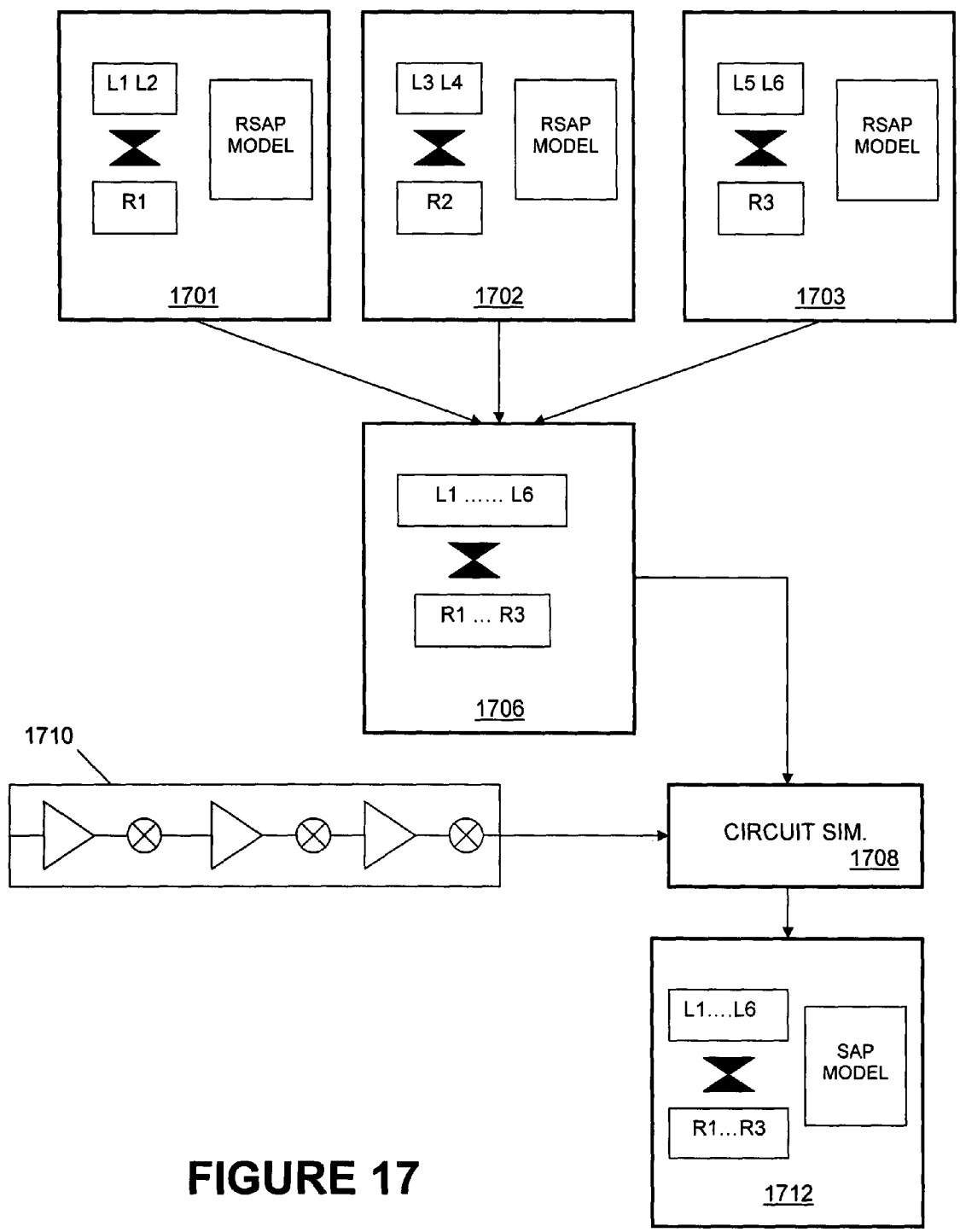
FIG. 17 illustrates an embodiment of a hierarchical SAP modeling process for local random variable integration and model generation.

In one embodiment, the SAP model illustrated in each of the components 1616-1618 of FIG. 16 can be a random SAP (RSAP) model. In this case each line source maps to a corresponding R value. FIG. 17 illustrates an embodiment of a hierarchical SAP modeling process for local random variable integration and model generation. As shown in FIG. 17, each individual RSAP model 1701-1703 for each different group of sources creates correlation of variables reflecting the entire variable space, 1706. These variable are then processed through a circuit simulation operation 1708 along with the global circuit 1710 to produce a reduced parameter sampling. An SAP model 1712 is then generated for the entire variable space based on the fast SAP simulation.

Figure 18:
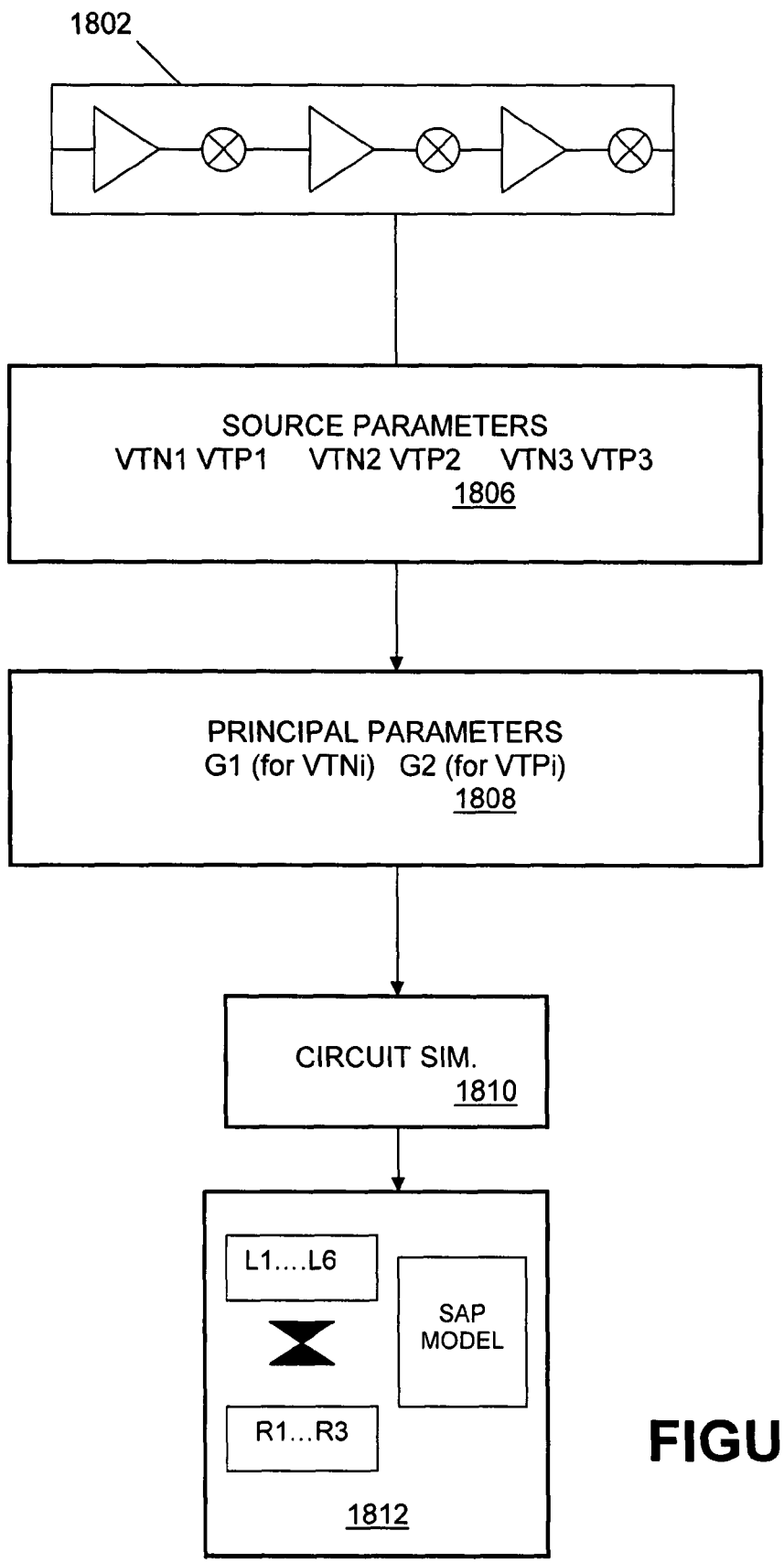
FIG. 18 illustrates a hierarchical SAP analysis process for global components, under an embodiment.

As shown in FIG. 15, the hierarchical SAP process can be applied to both global and local aspects of the overall circuit or system. FIG. 18 illustrates a hierarchical SAP analysis process for global components, under an embodiment. For the overall circuit 1802, a number of source parameters 1806 are derived. These source parameters include VTNi/VTPi pairs. These are used to generate the principal parameters 1808, which are denoted G1 for the VTNi source parameters and G2 for the VTPi source parameters. This results in only a few sampling points for the circuit simulation step 1810. An SAP model 1812 is then generated for the source and principal parameters.

In one embodiment, the local variables and global variables are integrated and then used to generate an integrated SAP model that reflects the entire variable space. Thus, an SAP model for Li→Ri (for the local variables) and VTNi VTPi→G1 G2 (for the global variables are integrated and then processed through an SAP step.

Figure 19:
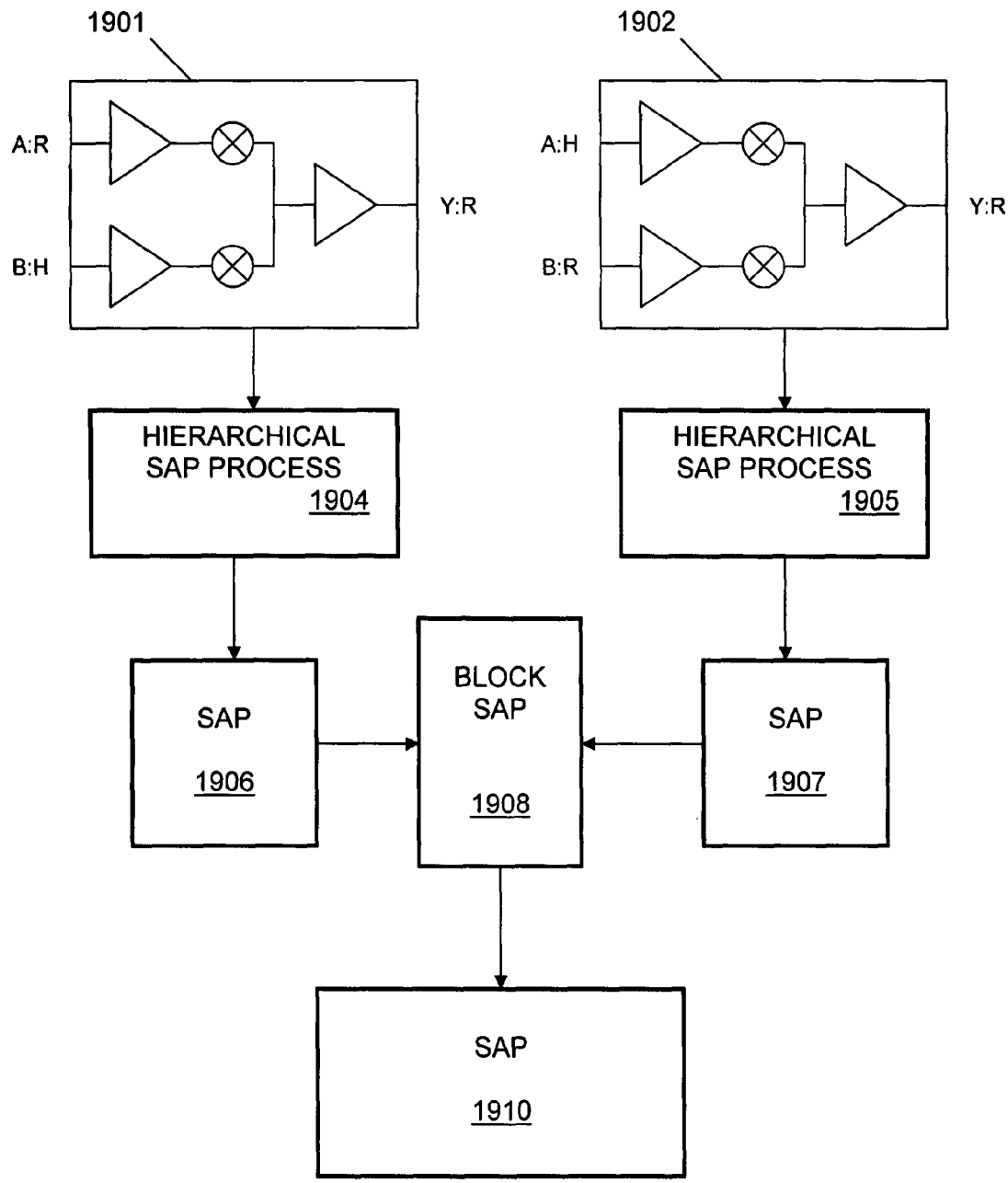
FIG. 19 illustrates a block SAP operation based on a hierarchical process flow, under an embodiment.

As shown in FIG. 13, the hierarchical SAP system can be extended to perform block SAP operations 1310. These provide certain variable functions, such as Maximum, Minimum, Add, and Subtract. The block SAP operation is based on hierarchical SAP flow results. FIG. 19 illustrates a block SAP operation based on a hierarchical process flow, under an embodiment. In FIG. 19, two illustrative circuit blocks 1901 and 1902 are shown. Each circuit is processed through respective hierarchical SAP process flows 1904 and 1905.

These processes may involve separate circuit simulation steps. The results of the hierarchical SAP process flows are then processed through respective flat SAP operations 1906 and 1907. The results of these operations are input to a block SAP process flow 1908. A final SAP analysis step 1910 processes the results of the block SAP flow. The SAP steps executed in conjunction with the block SAP flow 1908 do not involve the execution of any circuit simulation, thus streamlining the procedure. In order to enable such block SAP flow, as shown in FIG. 19, the circuit blocks must first be analyzed using a hierarchical SAP analysis using the same source variation definitions, and the common path in a source SAP must be the same transition.

As shown in FIG. 13, the hierarchical SAP analysis system 1300 includes a HSAP front-end component 1306. This component allows for full automatic control of the hierarchical system. It is configured to execute trace simulations without any source variations, and provide node status (Rise/Fall/High/Low) in a design. It is also configured to make sub-level circuit simulation decks and sub-level SAP simulations, as well as integrate sub-level SAP simulations and make top-level SAP simulations. To enable extensions into other circuit analysis scenarios the front-end component is further configured to interface to LVA results 1304 and to block SAP processes 1310.

In one embodiment, the circuit simulation processes or steps illustrated in any of FIGS. 13-19 may be implemented by a SPICE (Simulation Program with Integrated Circuit Emphasis) program, or any similar circuit simulation program.

Aspects of the hierarchical SAP (HSAP) process can be applied to any circuit, subsystem, set of devices, or components within a larger circuit or system. The level of granularity generally depends upon the constraints of the system and the requirements of the analysis, and is generally user-configurable. An application program embodying at least portions of the HSAP may include tools to facilitate definition of circuit blocks, signals, variables, and other relevant data elements.

Aspects of the SAP and HSAP system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the SAP include: microcontrollers with memory (such as electronically erasable programmable read only memory (EEPROM)), embedded microprocessors, firmware, software, etc. Furthermore, aspects of the SAP may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages.

Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs including, without limitation, net-list generation programs, place and route programs and the like.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the SAP is not intended to be exhaustive or to limit the systems and methods for fabricating ICs to the precise form disclosed. While specific embodiments of, and examples for, the SAP are described herein for illustrative purposes, various equivalent modifications are possible within the scope of other systems and methods for fabricating ICs, as those skilled in the relevant art will recognize. The teachings of the SAP provided herein can be applied to other processing systems and methods, not only for the systems and methods for fabricating ICs described above.

The elements and acts of the various embodiments described above can be combined to provide further embodiments. These and other changes can be made to the SAP system in light of the above detailed description.

What is claimed is:

1. A method comprising:
   defining a circuit as a plurality of sub-circuits;
   defining a set of one or more source parameters for each sub-circuit of the plurality of sub-circuits;
   executing a respective circuit simulation on each set of source parameters;
   executing a respective Stochastic Analysis Process (SAP) analysis on a result set of each respective circuit simulation;

integrating the results of each respective SAP analysis step to generate an integrated result data set;

performing a single circuit simulation step on the integrated result data set to generate an integrated simulated data set; and performing a final SAP analysis on the integrated simulated data set to generate a final simulation result;

wherein the SAP analysis comprises receiving an input distribution of one or more parameters of a pre-defined system and mutual correlations between the parameters;

normalizing the parameter distributions and decomposing the mutual correlations to generate standardized independent parameter sets;

generating a specific set of input values for sampling of the pre-defined system based on the standardized independent parameter sets;

performing pre-defined system sampling on the specific set of input values to generate pre-defined system output values;

performing orthogonal polynomial fitting on the specific set of input values, the predefined system output values, and the standardized independent parameter set to generate an SAP model; and using the SAP model to generate an output distribution of the pre-defined system output, wherein the system output is a statistical representation of the output distribution of the pre-defined system based on variation of the input parameters, and wherein the statistical representation comprises a Cumulated Distribution Function (CDF) set.

2. The method of claim 1 wherein the specific set of input values for sampling is determined through steps of:

defining a number of a fitting order of orthogonal polynomials;

obtaining the number of the parameters;

selecting probability roots of the orthogonal polynomials; and converting probability roots to the specific set of input values for sampling of the pre-defined system.

3. The method of claim 2 wherein the sub-circuits comprise a group of components selected from the group consisting of transistor devices and logic gate devices, and wherein the sub-circuits are components of an overall circuit.

4. The method of claim 3 further comprising:

executing a circuit simulation on the overall circuit;

executing an SAP analysis on the overall result set of the SAP simulation on the overall circuit;

integrating the overall result set with the result of the final SAP analysis to generate a combined final result set; and executing an SAP analysis on the combined final result set.

5. The method of claim 1 wherein the one or more source parameters for each sub-circuit of the plurality of sub-circuits generate corresponding principal variables, wherein the number of principal variables is less than the number of corresponding source parameters for each sub-circuit of the plurality of sub-circuits.

6. The method of claim 1 wherein the sub-circuit comprises two sub-circuits, the method comprising:

generating a final simulation result for each of the two sub-circuits; and executing a block SAP analysis on the final simulation results for each of the two sub-circuits.

7. A system for analyzing a circuit defined as a plurality of subcircuits, comprising:

first circuit means for defining a set of one or more source parameters for each sub-circuit of the plurality of sub-circuits;

second circuit means for executing a respective circuit simulation on each set of source parameters;

third circuit means for executing a respective Stochastic Analysis Process (SAP) analysis on a result set of each respective circuit simulation;

fourth circuit means for integrating the results of each respective SAP analysis step to generate an integrated result data set;

fifth circuit means for performing a single circuit simulation step on the integrated result data set to generate an integrated simulated data set;

sixth circuit means for performing a final SAP analysis on the integrated simulated data set to generate a final simulation result;

wherein the SAP analysis is performed by:

seventh circuit means for receiving an input distribution of one or more parameters of a pre-defined circuit and mutual correlations between the parameters;

eighth circuit means for normalizing the parameter distributions and decomposing the mutual correlations to generate standardized independent parameter sets;

ninth circuit means for generating a specific set of input values for sampling of the pre-defined circuit based on the standardized independent parameter sets;

tenth circuit means for performing pre-defined circuit sampling on the specific set of input values to generate pre-defined circuit output values;

eleventh circuit means for performing orthogonal polynomial fitting on the specific set of input values, the pre-defined circuit output values, and the standardized independent parameter set to generate an SAP model; and twelfth circuit means for using the SAP model to generate an output distribution of the pre-defined circuit.

8. The system of claim 7 wherein an output is a statistical representation of the output distribution of the pre-defined circuit based on the variation of input parameters.

9. The system of claim 8 further comprising:

further circuit means for defining a number of a fitting order of orthogonal polynomials;

further circuit means for obtaining the number of the parameters;

further circuit means for selecting probability roots of the orthogonal polynomials; and further circuit means for converting the probability roots to the specific set of input values for sampling of the pre-defined circuit.

10. The system of claim 7 further comprising:

further circuit means for executing a circuit simulation on an overall circuit;

further circuit means for executing an SAP analysis on an overall result set of a SAP simulation on the overall circuit;

further circuit means for integrating the overall result set with the result of the final SAP analysis to generate a combined final result set; and further circuit means for executing an SAP analysis on the combined final result set.

11. The system of claim 7 wherein the one or more source parameters for each sub-circuit of the plurality of sub-circuits generate corresponding principal variables, wherein the number of principal variables is less than the number of corresponding source parameters for each sub-circuit of the plurality of sub-circuits.

12. The system of claim 7 wherein the sub-circuit comprises two sub-circuits, the method comprising:

further circuit means for generating a final simulation result for each of the two sub-circuits; and further circuit means for executing a block SAP analysis on the final simulation results for each of the two sub-circuits.

* * * * *